(12) United States Patent
Hutson

(10) Patent No.: US 9,678,199 B2
(45) Date of Patent: Jun. 13, 2017

(54) PROPULSION DEVICE LIDAR SYSTEM AND METHOD

(71) Applicant: QUALCOMM Incorporated, San Diego, CA (US)

(72) Inventor: Donald Bolden Hutson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 14/611,074

(22) Filed: Jan. 30, 2015

(65) Prior Publication Data

US 2016/0223653 A1    Aug. 4, 2016

(51) Int. Cl.
G01S 7/481 (2006.01)
G01S 17/42 (2006.01)
G01S 17/87 (2006.01)
G01S 17/89 (2006.01)
G01S 17/08 (2006.01)
G01S 17/93 (2006.01)

(52) U.S. Cl.
CPC .......... *G01S 7/4817* (2013.01); *G01S 17/08* (2013.01); *G01S 17/42* (2013.01); *G01S 17/87* (2013.01); *G01S 17/89* (2013.01); *G01S 17/936* (2013.01); *B64C 2201/123* (2013.01)

(58) Field of Classification Search
CPC .... G08G 5/045; G08G 5/0021; G08G 5/0069; G08G 5/0078; G08G 5/04; G05D 1/101
See application file for complete search history.

(56) References Cited

U.S. PATENT DOCUMENTS

| | | |
|---|---|---|
| 5,864,391 A | 1/1999 | Hosokawa et al. |
| 8,786,835 B1 | 7/2014 | Reardon et al. |
| 2013/0128258 A1 | 5/2013 | Glad |
| 2014/0071234 A1 | 3/2014 | Millett |
| 2014/0180914 A1 | 6/2014 | Abhyanker |
| 2014/0240691 A1 | 8/2014 | Mheen et al. |
| 2015/0277440 A1* | 10/2015 | Kimchi ............... G05D 1/0202 701/26 |

FOREIGN PATENT DOCUMENTS

WO    WO-2013177650 A1    12/2013

OTHER PUBLICATIONS

International Search Report and Written Opinion—PCT/US2016/012904 ISA/EPO—May 6, 2016.

* cited by examiner

*Primary Examiner* — Luke Ratcliffe
(74) *Attorney, Agent, or Firm* — Foley & Lardner LLP

(57) ABSTRACT

Remote sensing systems and methods for using the same are disclosed. The remote sensing systems may include mirrors coupled to propulsion portions of a vehicle with which the remote sensing systems are integrated. The remote sensing systems may further include light transmitters and light receivers coupled to fixed portions of the vehicle.

28 Claims, 14 Drawing Sheets

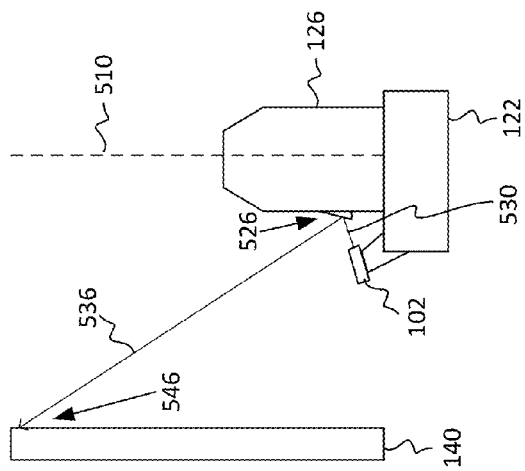
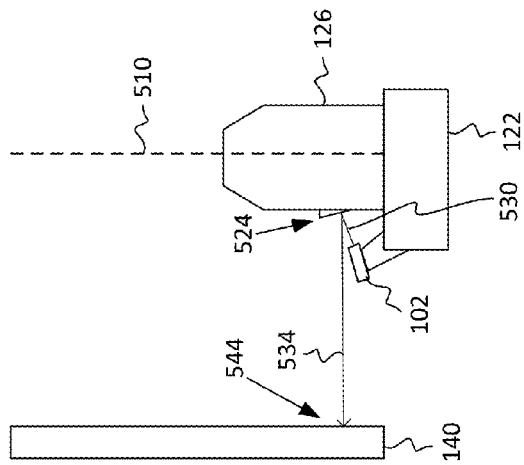
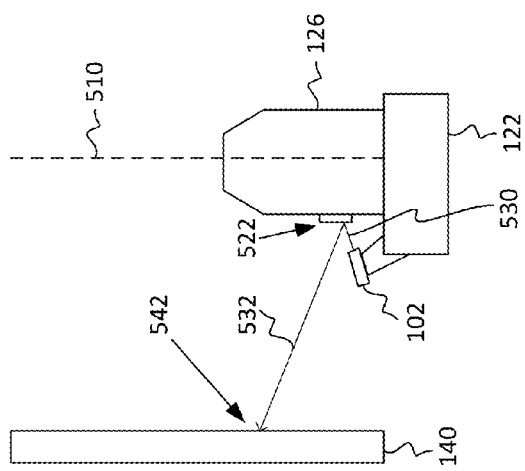

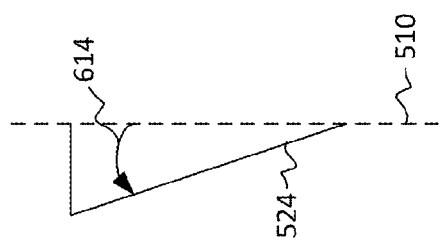
Figure 6A
Figure 6B
Figure 6C

PROPULSION DEVICE LIDAR SYSTEM AND METHOD

BACKGROUND

Field

Subject matter described herein relates generally to remote sensing with signal reflection, and, in particular embodiments, to lidar systems provided on vehicles.

Background

Remote sensing technologies allow the gathering of information about remote objects, such as by using radio or light emissions. Certain types of remote sensing technologies employ optical or other detectable signals that are reflected from the remote object or environmental features. As one example, lidar technology reflects a laser off of a remote object in order to determine the distance to that object. The distance is determined by observing the length of time that is required for light to reach the object, reflect off of the object, and return back to the point of the laser's emission.

Conventional lidar systems have been developed that are essentially self-contained apparatuses that can be affixed to vehicles. Such a self-contained apparatus may include a laser emitter, a movable mirror, a light detector, and a processor all in a single physical structure. Such apparatuses have conventionally been attached to vehicles in order to survey a physical space. For example, such apparatuses have been attached to the bottom of airplanes for surveying the surface of the earth and to the top of cars for surveying a streetscape. In such apparatuses, it is common to include a motor in the device that has the sole purpose of rotating the movable mirror, which allows reflection of the laser in multiple directions in rapid succession.

SUMMARY

Embodiments relate to remote sensing systems, including lidar systems.

Certain embodiments include a remote sensing system coupled to a vehicle. The remote sensing system includes a first plurality of mirrors coupled to a first propulsion portion of the vehicle. The system further includes a first set of one or more light transmitters, coupled to a first fixed portion of the vehicle, configured to emit light at the first plurality of mirrors to be reflected to a first measuring area. The system further includes a first set of one or more light receivers, coupled to the first fixed portion of the vehicle, configured to receive portions of the emitted light reflected from the first measuring area. The first propulsion portion of the vehicle is a portion of the vehicle that rotates relative to the first fixed portion of the vehicle, in order to cause the vehicle to be propelled in movement.

In some embodiments, the first propulsion portion of the vehicle comprises a motor configured to propel the vehicle.

In some embodiments, the motor comprises at least one of an outrunner motor, an inrunner motor, a hollow bore motor, and a gas powered motor.

In some embodiments, the first propulsion portion of the vehicle comprises at least one of: a rotor, an axle, and a wheel.

In some embodiments, the first fixed portion of the vehicle is a portion of the vehicle that does not rotate in order to cause the vehicle to be propelled in movement.

In some embodiments, the first propulsion portion of the vehicle rotates about a first axis. In such embodiments, a first mirror of the first plurality of mirrors is fixed at a first angle relative to the first axis. In such embodiments, a second mirror of the first plurality of mirrors is fixed at a second angle relative to the first axis. In such embodiments, the first angle is different than the second angle.

In some embodiments, the first mirror of the first plurality of mirrors is fixed at a third angle relative to a second axis. In such embodiments, the second mirror of the first plurality of mirrors is fixed at a fourth angle relative to the second axis. In such embodiments, the third angle is different than the fourth angle. In such embodiments, the second axis is perpendicular to the first axis.

In some embodiments, the first propulsion portion of the vehicle rotates about a first axis. In such embodiments, a first light transmitter of the first set of one or more light transmitters is arranged relative to a first mirror of the first plurality of mirrors in order to reflect light emissions from the first light transmitter off of the first mirror at a first angle relative to the first axis. In such embodiments, the first light transmitter is arranged relative to a second mirror of the first plurality of mirrors in order to reflect light emissions from the first light transmitter off of the second mirror at a second angle relative to the first axis. In such embodiments, the first angle is different than the second angle.

In some embodiments, a second light transmitter of the first set of one or more light transmitters is arranged relative to the second mirror in order to reflect light emissions from the second light transmitter off of the second mirror at the second angle relative to the first axis. In such embodiments, the first light transmitter emits light to be reflected off of the first mirror at the first angle simultaneously in time with the second light transmitter emitting light to be reflected off of the second mirror at the second angle.

In some embodiments, at a first time, the first light transmitter emits light to be reflected off of the first mirror at the first angle. In such embodiments, at a second time, the first light transmitter emits light to be reflected off of the second mirror at the second angle. In such embodiments, the first time is different than the second time.

In some embodiments, at the second time, a second light transmitter of the first set of one or more light transmitters emits light to be reflected off of the first mirror at the first angle.

In some embodiments, at a third time, the first light transmitter emits light to be reflected off of a third mirror of the first plurality of mirrors at a third angle relative to the first axis. In such embodiments, at the third time, the second light transmitter emits light to be reflected off of the second mirror at the second angle.

In some embodiments, the remote sensing system further includes a first set of one or more light detectors, coupled to the first set of one or more light receivers, configured to generate first remote sensing data signals based on the portions of the emitted light reflected from the first measuring area and received by the first set of one or more light receivers. In such embodiments, the remote sensing system further includes a processor configured to receive the first remote sensing data signals from the first set of one or more light detectors.

In some embodiments, the processor is configured to process the first remote sensing data signals received from the first set of one or more light detectors in order to determine a distance from the vehicle to the first measuring area.

In some embodiments, the processor is configured to provide the determined distance to the first measuring area to a controller of the vehicle in order to navigate the vehicle in motion through a surrounding environment including the first measuring area.

In some embodiments, the remote sensing system further includes one or more sensors, coupled to the first fixed portion of the vehicle, configured to detect a rotational speed of the first propulsion portion.

In some embodiments, the remote sensing system further includes a first set of one or more light detectors, coupled to the first set of one or more light receivers, configured to generate first remote sensing data signals based on the portions of the emitted light reflected from the first measuring area and received by the first set of one or more light receivers. In such embodiments, the remote sensing system further includes a processor configured to receive the first remote sensing data signals from the first set of one or more light detectors and configured to receive information based on the detected rotational speed of the first propulsion portion.

In some embodiments, the processor is configured to process the first remote sensing data signals received from the first set of one or more light detectors and the information based on the detected rotational speed of the first propulsion portion in order to determine a distance from the vehicle to the first measuring area.

In some embodiments, the remote sensing system further includes a second plurality of mirrors coupled to a second propulsion portion of the vehicle. In such embodiments, the remote sensing system further includes a second set of one or more light transmitters, coupled to a second fixed portion of the vehicle, configured to emit light at the second plurality of mirrors to be reflected to a second measuring area. In such embodiments, the remote sensing system further includes a second set of one or more light receivers, coupled to the second fixed portion of the vehicle, configured to receive portions of the emitted light reflected from the second measuring area. In such embodiments, the remote sensing system further includes a second set of one or more light detectors, coupled to the second set of one or more light receivers, configured to generate second remote sensing data signals based on the portions of the emitted light reflected from the second measuring area and received by the second set of one or more light receivers. In such embodiments, the processor is configured to receive the first remote sensing data signals from the first set of one or more light detectors and the second remote sensing data signals from the second set of one or more light detectors. In such embodiments, the first propulsion portion of the vehicle and the second propulsion portion of the vehicle are separate physical structures that each rotate in order to cause the vehicle to be propelled in movement.

In some embodiments, the processor is configured to process the first remote sensing data signals received from the first set of one or more light detectors and the second remote sensing data signals from the second set of one or more light detectors in order to determine a distance from the vehicle to the first measuring area and a distance from the vehicle to the second measuring area.

In some embodiments, the processor is configured to process remote sensing data signals in order to determine distances from the vehicle to measuring areas in substantially all directions around the vehicle.

According to some embodiments, a method of remote sensing in a space around a vehicle is provided. The method includes emitting light from a first set of one or more light transmitters at a first plurality of mirrors to be reflected to a first measuring area, the first plurality of mirrors coupled to a first propulsion portion of the vehicle and the first set of one or more light transmitters coupled to a first fixed portion of the vehicle. The method includes receiving portions of the emitted light reflected from the first set of first measuring area at a first set of one or more light receivers, the first set of one or more light receivers coupled to the first fixed portion of the vehicle. The first propulsion portion of the vehicle is a portion of the vehicle that rotates in order to cause the vehicle to be propelled in movement.

In some embodiments, the first propulsion portion of the vehicle comprises a motor configured to propel the vehicle.

In some embodiments, the first fixed portion of the vehicle is a portion of the vehicle that does not rotate in order to cause the vehicle to be propelled in movement.

In some embodiments, the first propulsion portion of the vehicle rotates about a first axis. In such embodiments, a first mirror of the first plurality of mirrors is fixed at a first angle relative to the first axis. In such embodiments, a second mirror of the first plurality of mirrors is fixed at a second angle relative to the first axis. In such embodiments, the first angle is different than the second angle.

In some embodiments, the first mirror of the first plurality of mirrors is fixed at a third angle relative to a second axis. In such embodiments, the second mirror of the first plurality of mirrors is fixed at a fourth angle relative to the second axis. In such embodiments, the third angle is different than the fourth angle. In such embodiments, the second axis is perpendicular to the first axis.

In some embodiments, the first propulsion portion of the vehicle rotates about a first axis. In such embodiments, light emissions of a first light transmitter of the first set of one or more light transmitters reflect off of a first mirror of the first plurality of mirrors at a first angle relative to the first axis. In such embodiments, light emissions of the first light transmitter of the first set of one or more light transmitters reflect off of a second mirror of the first plurality of mirrors at a second angle relative to the first axis. In such embodiments, the first angle is different than the second angle.

BRIEF DESCRIPTION OF THE DRAWINGS

FIGS. 5A, 5B, and 5C are diagrams of arrangements of components of a remote sensing system according to some embodiments.

FIGS. 6A, 6B, and 6C are diagrams of angles of mirrors of a remote sensing system according to some embodiments.

DETAILED DESCRIPTION

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well-known structures and components are shown in block diagram form in order to avoid obscuring such concepts.

The embodiments described herein provide various benefits over conventional remote sensing systems. Some embodiments described herein may allow a remote sensing system, such as but not limited to a lidar system, to be coupled to a vehicle, while minimizing the resulting marginal weight increase to the vehicle. Such embodiments may achieve this benefit by integrating portions of the lidar system with existing components (components that are used for other purposes) on the vehicle. In certain embodiments, one or more arrays of mirrors used in a lidar system may be coupled to one or more propulsion portions on the vehicle to rotate in conjunction with the propulsion portions propelling the vehicle in movement. Some embodiments described herein may provide the benefit of allowing remote sensing in essentially all directions around the vehicle. Such embodiments may achieve this benefit by integrating multiple lidar systems with multiple propulsion portions of the vehicle and processing the remote sensing data produced by the multiple lidar systems with a single processor. Various other benefits of the embodiments disclosed herein will be evident.

Figure 1:
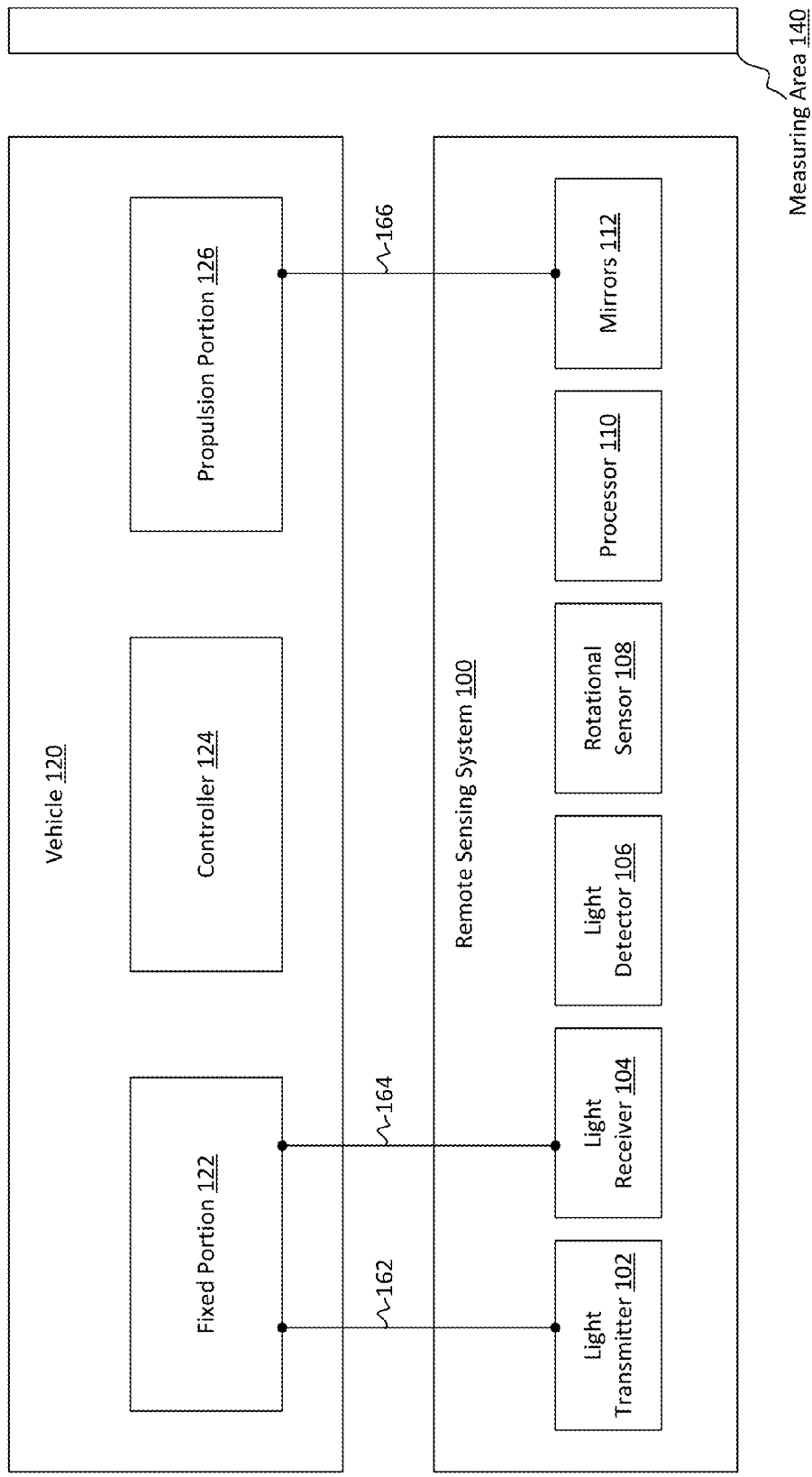
FIG. 1 is a schematic diagram of a vehicle, a remote sensing system, and a measuring area according to some embodiments.

FIG. 1 is a schematic diagram of a remote sensing system 100, a vehicle 120, and a measuring area 140 according to some embodiments.

The remote sensing system 100 may have a light transmitter 102. The light transmitter 102 may be a device configured to emit a beam of light at an array of mirrors 112 so that the beam of light reflects off of the mirrors 112 in the direction of the measuring area 140. In some embodiments, the light transmitter 102 may include a laser source, and the beam of light may be a laser. Other embodiments may employ other suitable forms of light transmitters 102 including, but not limited to, light transmitters that have one or more LED, incandescent, gas discharge, electroluminescent, electron-stimulated or other light sources.

The remote sensing system 100 may have a light receiver 104. The light receiver 104 may be a device configured to receive reflections of the beam of light emitted towards the measuring area 140 as the beam of light strikes the measuring area 140. In some embodiments, the light receiver 104 may include a telescope, lens, array of lenses, light guide or other optics, or combinations thereof, for receiving (observing) and/or focusing light reflected back from one or more objects at one or more locations in the measuring area 140.

The remote sensing system 100 may include a light detector 106 configured to detect light received by the light receiver 104. The light detector 106 may be configured to generate sensing data signals based on the light received by the light receiver 104. For example, the light detector 106 may generate a digital data signal (e.g., a remote sensing data signal) based on the length of time between the emission of a pulse of light by the light transmitter 102 and the reception of the reflected pulse of light reflected back from the measuring area 140. Accordingly, the light detector 106 may be configured to encode data representing a result of the light emission and light reception of the light transmitter 102 and the light receiver 104, respectively. In some embodiments, the remote sensing data signal may contain further information such as, but not limited to, information corresponding to the time at which the light signal from the light transmitter 102 was emitted, or other time or timestamp value corresponding to a time when the encoded data was observed. In some embodiments, the remote sensing data signal may contain information corresponding to a rate of rotation of a propulsion portion 126 of the vehicle 120. In some embodiments, the light detector 108 may be configured to transmit the generated remote sensing data signal to a processor 110.

The remote sensing system 100 may have a rotational sensor 108. The rotational sensor 108 may be a device configured to detect the rotation of the propulsion portion 126 of the vehicle 120. In some embodiments, the rotational sensor 108 may generate a rotational data signal corresponding to the detected rotation of the propulsion portion 126 by the rotational sensor 108. In some embodiments, the rotational data signal may indicate that rotation of the propulsion portion 126 has occurred. For example, the rotational data signal may indicate that one full rotation of the propulsion portion 126 has occurred. As a further example, the rotational data signal may indicate that a predefined fraction of a rotation (such as, but not limited to, ⅓ of a rotation) or multiple full or fractions of rotations (such as, but not limited to, 1000 rotations) of the propulsion device 126 has occurred. In some embodiments, the rotational data signal may indicate a rate of rotation of the propulsion portion 126. For example, the rotational data signal may indicate a detected number of rotations per unit time (e.g., rotations per second) of the propulsion portion 126. The rate of rotation may be referred to as a rotational speed, angular speed, angular velocity, etc. In some embodiments, the rotational data signal may indicate a particular position of the propulsion portion 126. For example, if the propulsion portion 126 is provided as an outrunner motor, then the rotational data signal may indicate an orientation of the outrunner motor around the axis of rotation of the outrunner motor. As a continuation of the example, the rotational data signal may indicate an angular position as an angular difference (e.g., in degrees) between the observed outrunner motor angular position and a reference (e.g., "starting" or "origin") angular position of the outrunner motor. In some embodiments, the rotational sensor 108 may be provided as a single switch positioned adjacent to the propulsion portion 126 and capable of detecting rotation of the propulsion portion 126 (for example, based on a magnetic field generated by the propulsion portion 126). In some embodiments, the rotational sensor 108 may be provided as three switches positioned adjacent to the propulsion portion 126 and capable of detecting rotation of the propulsion portion 126 based on a magnetic field generated by a three-phase motor included as part of the propulsion portion 126. In some embodiments, the rotational sensor 108 may be provided as a Hall effect sensor. In some embodiments, the rotational sensor 108 may be configured to transmit the generated rotational data signal to the processor 110. In some embodiments, the rotational sensor 108 may be configured to transmit the generated rotational data signal to the light detector 106. Other embodiments may employ other suitable forms of rotational sensors 108.

The remote sensing system 100 may include the processor 110 configured to process at least remote sensing data signals in order to determine a distance from the vehicle 120 to the measuring area 140. In some embodiments, the processor 110 may receive remote sensing data signals (e.g., from the light detector 106) that represent or indicate a time differential between light transmission (e.g., by the light transmitter 102) and light reception (e.g., by the light receiver 104). In such embodiments, the processor 110 may determine a distance between the vehicle 120 and the measuring area 140 based on the indicated time differential and the known speed of light. In some embodiments, the processor 110 may be provided as a digital microprocessor with appropriate instructions for processing remote sensing data signals. In some embodiments, the processor 110 may be configured to transmit distance determinations to a controller 124. In some embodiments, the processor 110 may be configured to additionally transmit a direction corresponding to each distance determination to the controller 124. In such embodiments, the controller 124 may use the received distance determinations to navigate the vehicle 120 through a surrounding environment including the measuring area 140 for which distance determinations were provided.

The processor 110 may determine a direction that corresponds to a determined distance. In some embodiments, the processor 110 may use information retrieved from storage (e.g., memory (not shown)) in combination with a device indicator and an angular position indicator provided in the remote sensing data signal in order to determine a particular vector along which light was emitted for a time differential value included in the same remote sensing data signal. In this way, the processor 110 may determine a distance from the vehicle 120 to a particular point in the measuring area 140, while also specifying a particular vector that corresponds to a direction in three-dimensional space for that determined distance.

In some embodiments, the processor 110 may use a device indicator provided in the remote sensing data signal to determine a direction for a determined distance. A remote sensing data signal may include a device indicator that indicates a source device for the remote sensing data signal. For example, a remote sensing data signal may identify the light detector 106 (or, e.g., the light transmitter 102 or the light receiver 104) as the source device for the remote sensing data signal. Continuing this example, the processor 110 may determine (e.g., based on a stored mapping table) that the light detector 106 corresponds to the measuring area 140 (e.g., a frontwards-leftwards-upwards field for the vehicle 120). As another example, a remote sensing data signal may identify the light transmitter 102 (or, e.g., the light receiver 104) as the source device for the remote sensing data signal. Continuing this example, the processor 110 may determine (e.g., based on a stored mapping table) that the light transmitter 102 corresponds to a particular portion or sub-part of the measuring area 140 (e.g., a frontwards third of a frontwards-leftwards-upwards field for the vehicle 120). The processor 110 may use a device identifier or other identifiers in various other ways to determine a direction for a determined distance.

In some embodiments, the processor 110 may use an angular position indicator to determine a direction for a determined distance. A remote sensing data signal may include an angular position indicator that indicates an angular position of the propulsion portion 126 at the time an observation was made leading to generation of the remote sensing data signal. For example, a remote sensing data signal may indicate an angular position of 90 degrees for the propulsion portion 126 at the time the light was emitted (e.g., from the light transmitter 102) and received (e.g., from the light receiver 104) for the same remote sensing data signal. Continuing this example, the processor 110 may determine (e.g., based on a stored mapping table) that an angular position of 90 degrees for the propulsion portion 126 corresponds to a third mirror in the array of mirrors 112, which has a vertical deflection angle for the emitted light of 15 degrees (e.g., relative to a horizon plane or ground plane for the vehicle 120). In some embodiments, the angular position value may be provided from the rotational sensor 108 separate from any particular remote sensing data signal received from the light detector 106. In such embodiments, the processor 110 may determine an angular position value corresponding to a remote sensing data signal based on a time value (e.g., proximity of arrival of the signals at the processor 110 or timestamp values in the signals). The processor 110 may use an angular position, rotational speed, or other identifiers in various other ways to determine a direction for a determined distance.

The remote sensing system 100 may include the array of mirrors 112 configured to reflect light emitted from the light transmitter 102. In some embodiments, the mirrors 112 may be coupled to the propulsion portion 126 of the vehicle 120. In such embodiments, the mirrors 112 may rotate as the propulsion portion 126 rotates. The mirrors 112 may be positioned so as to align with the light transmitter 102 and the light receiver 104 at one or more points during each one or more rotations of the propulsion portion 126. In some embodiments, the mirrors 112 may be arranged at a plurality of angles relative to a first axis (e.g., an axis of rotation of the propulsion portion 126). In some embodiments, the mirrors 112 may be additionally arranged at a plurality of angles relative to a second axis (e.g., an axis perpendicular to the first axis). In this way, light from the light transmitter 102 may be reflected in a plurality of directions from the various individual mirrors of the array of mirrors 112. As such, time differential measurements (and thus distance determinations) may be produced for a variety of directions for a single instance of the light transmitter 102 and the light receiver 104.

The vehicle 120 may include the propulsion portion 126. The propulsion portion 126 may be any portion of the vehicle 120 that rotates in order to cause the vehicle 120 to be propelled in movement. In some embodiments, the propulsion portion 126 may be a motor that cause the vehicle 120 to move along a surface on which the vehicle 120 contacts or through a fluid (e.g., air or water) in which the vehicle 120 is present. For example, the propulsion portion 126 may include an outrunner motor, an inrunner motor, a hollow bore motor, a gas powered motor, or some other motor. In some embodiments, the propulsion portion 126 may be a component of the vehicle 120 (other than a motor) that rotates in conjunction with, or to cause, the vehicle 120 to move along a surface or through a fluid (e.g., air or water). For example, the propulsion portion 126 may include a rotor, an axle, a wheel, a transmission gear, a propeller, or some other rotary body. However, in particular embodiments, the propulsion portion 126 is part of the propulsion system that propels the vehicle 120 along a surface or through a fluid (and not a separate motor or other body that rotates for the dedicated and sole purpose of rotating the mirrors 112).

The vehicle 120 may have a fixed portion 122 that is not rotated to cause the vehicle 120 to be propelled in movement. Namely, while the propulsion portion 126 may rotate with respect to the rest of the vehicle 120 (including the fixed portion 122), the fixed portion 122 may remained fixed in position with respect to the rest of the vehicle 120. In some embodiments, the fixed portion 122 may include a frame portion of the vehicle 120. In other embodiments, the fixed portion 122 may be other members fixed to the frame portion of the vehicle.

The vehicle 120 may have a controller 124. The controller 124 may be an electronic device configured to control movement of the vehicle 120. In some embodiments, the controller 124 may provide control signals to the propulsion portion 126 to control movement of the vehicle 120. In some embodiments, the controller 124 may provide velocity control signals to the propulsion portion 126 to control (e.g., increase or decrease) an angular velocity of the propulsion portion 126. In some embodiments, the controller 124 may receive distance and direction values from the processor 110. In such embodiments, the controller 124 may use the distance and direction information in order to navigate the vehicle 120 in a surrounding environment (e.g., avoiding physical obstacles defined by the distance and direction information). In some embodiments, the controller 124 may be integrated with the processor 110.

Various portions of the remote sensing system 100 may be coupled to the vehicle 120. In some embodiments, the light transmitter 102 may be coupled to the fixed portion 122 by a coupling 162. In such embodiments, the light receiver 104 may additionally be coupled to the fixed portion 122 by a coupling 164. In such embodiments, the mirrors 112 may be coupled to the propulsion portion 126 by a coupling 166. The couplings 162, 164, and 166 may be provided in any conventional fashion, such as chemical fasteners (e.g., glue, other adhesive); electromagnetic fasteners (e.g., magnets); mechanical fasteners (e.g., screws, nails, clips, ties); and/or coupled in any other suitable manner.

Coupling of components of the remote sensing system 100 to particular components of the vehicle 120 may provide various benefits. With the coupling of the array of mirrors 112 to the propulsion portion 126, the array of mirrors 112 may be caused to rotate along with the propulsion portion 126. With the coupling of the light transmitter 102 and the light receiver 104 to the fixed portion 122, the light transmitter 102 and the light receiver 104 may be caused to remain in a fixed position with respect to the rest of the vehicle 120, and in particular to the mirrors 112 and the propulsion portion 126. In particular, the propulsion portion 126 may cause the array of mirrors 112 to rotate in a field in front of the light transmitter 102 and the light receiver 104 so that the individual mirrors of the array of mirrors 112 may each be present in front of the light transmitter 102 and the light receiver 104 at some point in time during rotation of the array of mirrors 112. Based on this rotation, the light transmitter 102 and the light receiver 104 may be capable of and configured to emit/receive light from each individual mirror of the array of mirrors 112 at a different point in time. If the individual mirrors of the array of mirrors 112 are positioned at varying angles with respect to some axis or axes, then a single pair of the light transmitter 102 and the light receiver 104 may be capable of and configured to emit/receive light for multiple directions without the pair of the light transmitter 102 and the light receiver 104 having to move. Furthermore, with such a coupling of the array of mirrors 112 to the propulsion portion 126, this rotation of the array of mirrors 112 may be achieved without the need to add a dedicated motor for rotating the mirrors 112. In this way, the integration of the remote sensing system 100 with the vehicle 120 may be achieved with a lower marginal weight increase (e.g., compared to a remote sensing system with a dedicated motor for rotating mirrors) and with fewer points of failure (i.e., no failure point for a dedicated motor for rotating mirrors).

Figure 2:
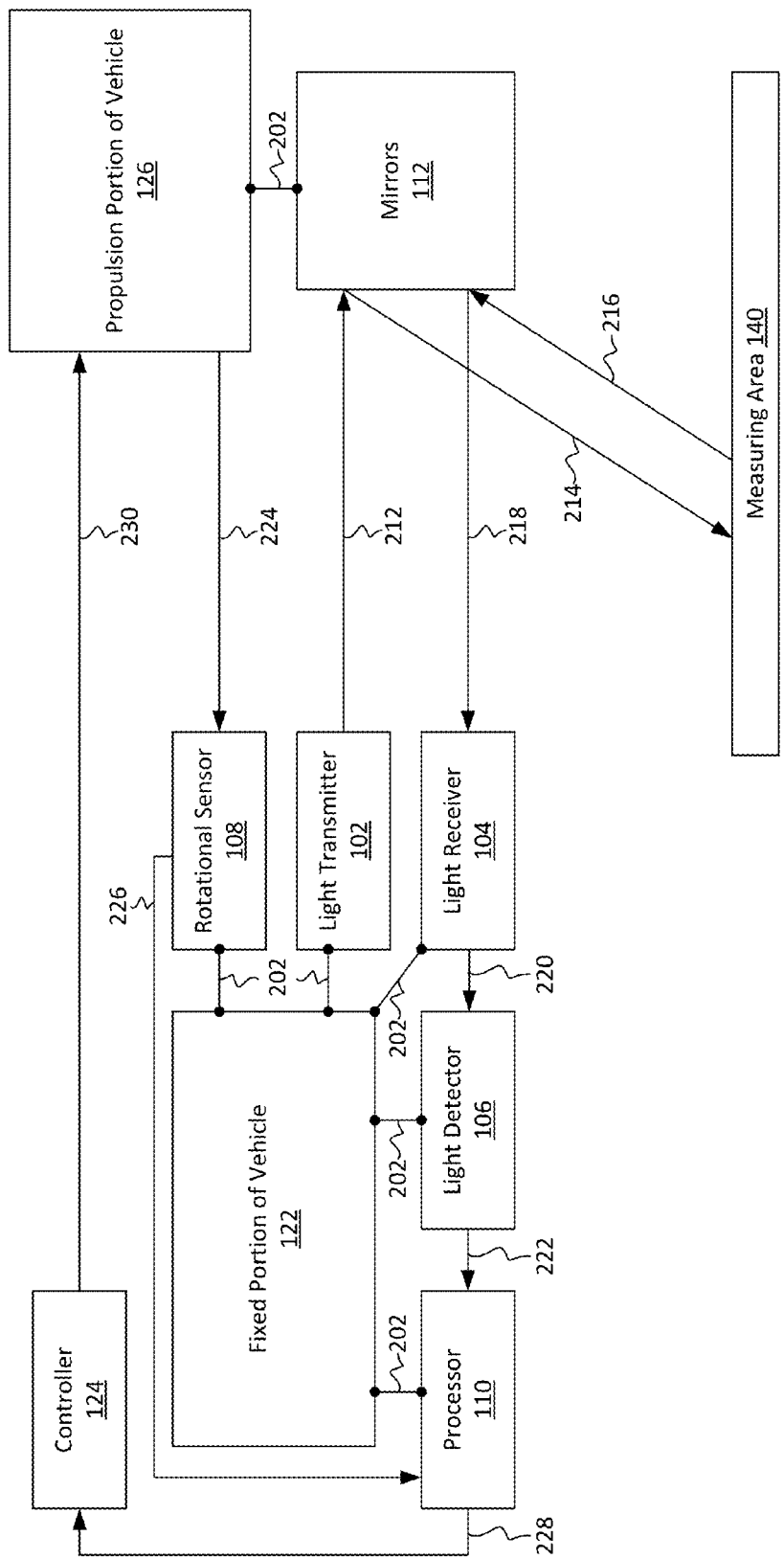
FIG. 2 is a schematic diagram of a vehicle, a remote sensing system, and a measuring area according to some embodiments.

FIG. 2 is a schematic diagram of components of the remote sensing system 100, components of the vehicle 120, and the measuring area 140 according to some embodiments. With reference to FIGS. 1-2, components of the remote sensing system 100 and the vehicle 120 may interact in various manners. In some embodiments, the light transmitter 102, the light receiver 104, the light detector 106, the rotational sensor 108, and the processor 110 may be coupled to the fixed portion 122 by couplings 202. The mirrors 112 may be coupled to the propulsion portion 126 by coupling 202. Couplings 202 may be similar to those described with respect to couplings 162, 164, and 166.

In some embodiments, components of the remote sensing system 100 and the vehicle 120 may exchange signals, information, and other interactions. The light transmitter 102 may emit a light beam 212 at the mirrors 112. The mirrors 112 may reflect the light beam 212, as a light beam 214, towards the measuring area 140. Upon the light beam 214 striking the measuring area 140, portions of the light beam 214 may be reflecting back in the direction of the mirrors 112 as a reflected light 216. The mirrors 112 may reflect the reflected light 216, as a reflected light 218, towards the light receiver 104. The light receiver 104 may receive the reflected light 218. The light detector 220 may receive (observe) a received light 220 as a light received by light receiver 104. The light detector 106 may generate a remote sensing data signal 222 corresponding to a time difference between the time at which light beam 212 was initially emitted by the light transmitter 102 and the time at which the reflected light 218 was initially received by the light receiver 104. The light detector 106 may transmit the remote sensing data signal 222 to the processor 110.

The rotational sensor 108 may receive an electromagnetic signal 224 from the propulsion portion 126. The rotational sensor 108 may generate a rotational data signal 226 corresponding to an angular position indicated by the electromagnetic signal 224. The rotational sensor 108 may transmit the rotational data signal 226 to the processor 110.

The processor 110 may process the received remote sensing data signal 222 and the received rotational data signal 226 to determine a direction and a distance to the measuring area 140. The processor 110 may transmit the determined distance and direction to the measuring area 140 as a signal 228 to the controller 124. The controller 124 may use the distance and direction information included in the signal 228 to navigate (or assist with navigation of) the vehicle 120 through a surrounding environment (e.g., avoiding striking an obstacle defined by measuring area 140). The controller 124 may transmit a propulsion control signal 230 to the propulsion portion 126 to navigate or otherwise move the vehicle 120 through the surrounding environment. The propulsion portion 126 may be caused to rotate based on the received propulsion control signal 230. Rotation of the propulsion portion 126 may cause the mirrors 112 to rotate as well.

Figure 3:
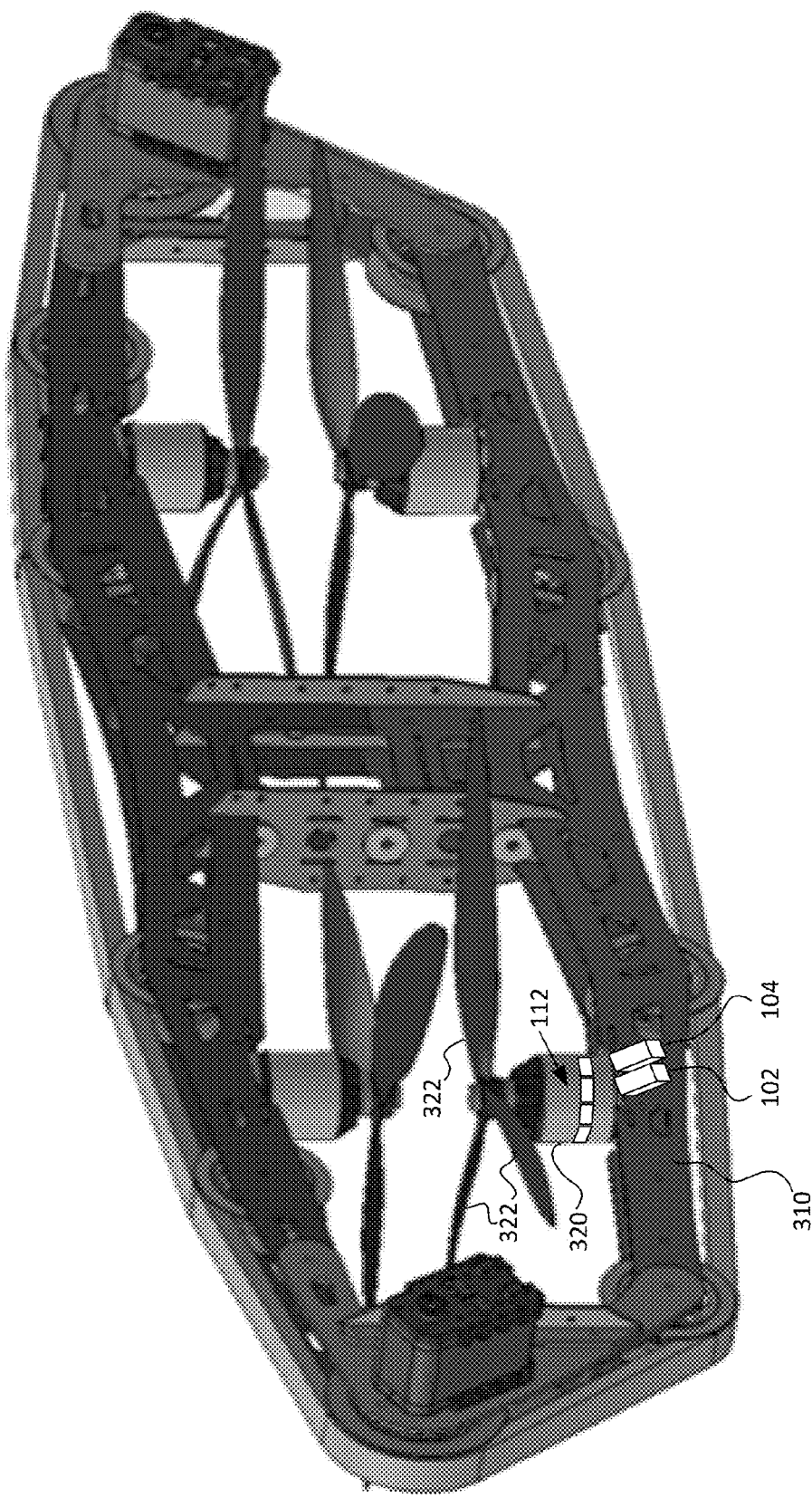
FIG. 3 is a perspective diagram of a vehicle and a remote sensing system according to some embodiments.

FIG. 3 is a perspective diagram of the vehicle 120 and the remote sensing system 100 according to some embodiments. With reference to FIGS. 1-3, the vehicle 120 may be an unmanned aerial/ground vehicle with components of the remote sensing system 100 attached to propeller motors of the vehicle 120.

In some embodiments, the vehicle 120 may be an unmanned aerial/ground vehicle. The vehicle 120 may have a frame 310. The frame 310 may be the fixed portion 122 as described. The vehicle 120 may have an outrunner motor 320 that drives propellers 322. The propellers 322 as driven by the outrunner motor 320 may cause the vehicle 120 to be propelled through the air by providing a lifting force. The outrunner motor 320 may be a propulsion portion 126 as described.

In some embodiments, components of the remote sensing system 100 may be coupled to the unmanned aerial/ground vehicle 120. The light transmitter 102 and the light receiver 104 may be coupled to the frame 310 of the vehicle 120. The mirrors 112 may be coupled to the outside of the outrunner motor 320. The mirrors 112 may be arranged in a band around the circumference of the outrunner motor 320. In this way, as the outrunner motor 320 rotates, the array of mirrors 112 rotate. Additionally, as the array of mirrors 112 rotate, different individual mirrors of the array of mirrors 112 are present in front of the light transmitter 102 and the light receiver 104 at respectively different sequential points in time. The arrangement of the mirrors 112 in a band around the outside of the outrunner motor 320 may form an annular array. The array may be a ring-shaped sequence of individual mirrors of the mirrors 112. The opening in the center of the annular array may be filled by the outrunner motor 320. In this way, the outrunner motor 320 may pass through the opening in the center of the annular array of mirrors 112.

In some embodiments, the light transmitter 102, the light receiver 104, and the mirrors 112 may cause light beams to be emitted in a frontwards-leftwards-upwards field of the vehicle 120. In particular, if the outrunner motor 320 is provided in a lower-front position of the vehicle 120 and if the light transmitter 102 and the light receiver 104 are provided on a left side of the vehicle 120, then the light emissions reflected by the mirrors 112 may be directed to a field generally towards the front of the vehicle 120, generally to the side and upwards from the vehicle 120, and generally to the left of the vehicle 120. In this way, the positioning of components of the remote sensing system 100 on a particular propulsion device of the vehicle 120 may allow the remote sensing system 100 to generate time differential information and distance information for a predefined direction from the vehicle 120 (where the predefined direction is a subset of all directions around the vehicle 120).

Figure 4:
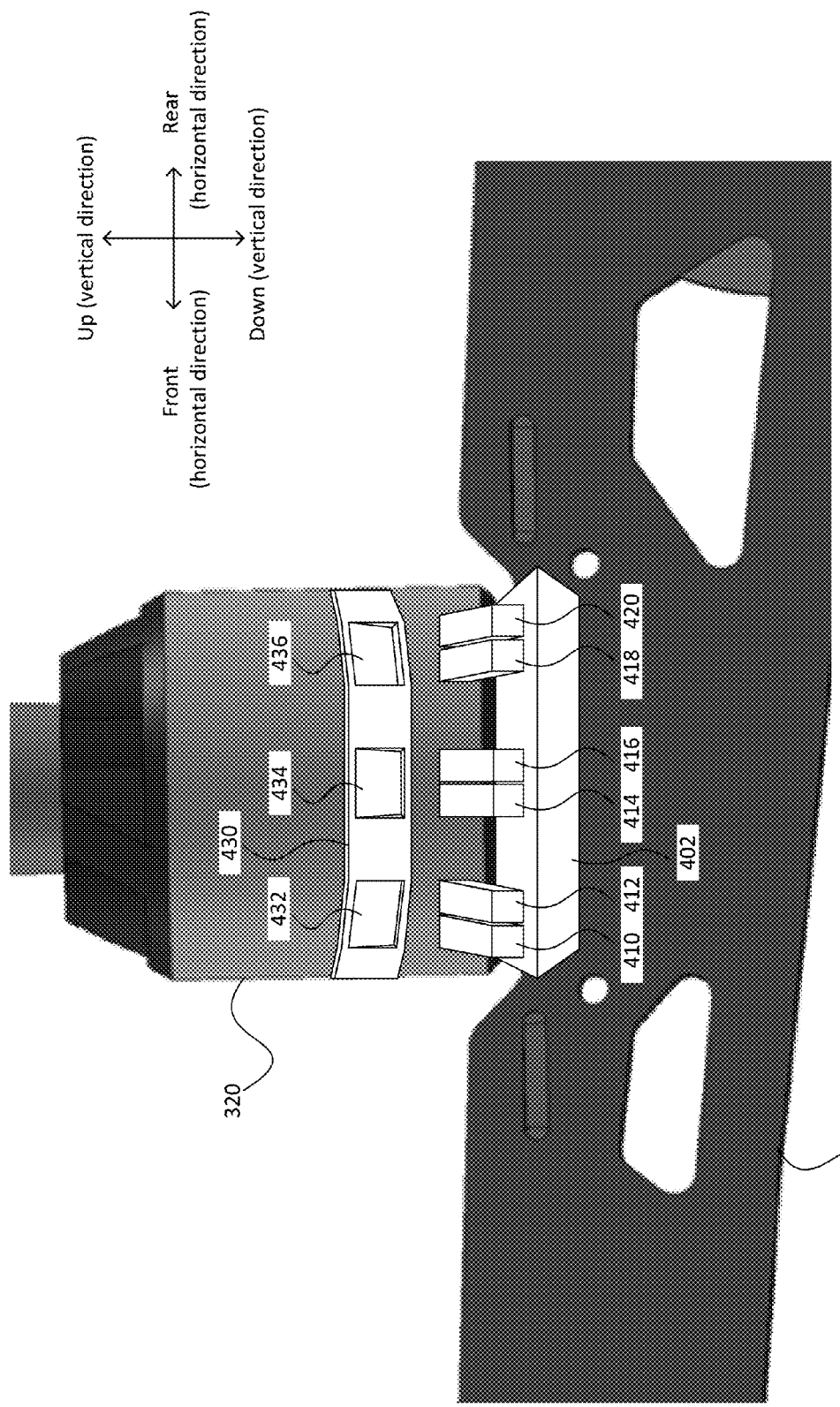
FIG. 4 is a perspective diagram of a vehicle and a remote sensing system according to some embodiments.

FIG. 4 is a perspective diagram of the vehicle 120 and the remote sensing system 100 according to some embodiments. With reference to FIGS. 1-4, the remote sensing system 100 may include multiple pairs of light transmitters/receivers for a single set of mirrors on a single propulsion portion of the vehicle 120.

In some embodiments, the remote sensing system 100 may include three pairs (or any other suitable number) of light transmitters/receivers: a light transmitter 410 and a light receiver 412; a light transmitter 414 and a light receiver 416; and a light transmitter 418 and a light receiver 420. The light transmitters 410, 414, 418 may be provided as described for the light transmitter 102. The light receivers 412, 416, 420 may be provided as described for the light receiver 104. The light transmitters 410, 414, 418 and the light receivers 412, 416, 420 may be mounted on a fixed structure 402 that is mounted on the frame 310 of the vehicle 120. In this way, the light transmitters 410, 414, 418 and the light receivers 412, 416, 420 may be coupled to a fixed portion of the vehicle 120 (i.e., the frame 310).

In some embodiments, the remote sensing system 100 may include an array of mirrors 432, 434, and 436 in a band structure 430. The mirrors 432, 434, 436 may be provided as described for the mirrors 112. The band structure 430 may be a physical structure in which the mirrors 432, 434, 436 are mounted. The band structure 430 may be coupled to the outrunner motor 320. In this way, the mirrors 432, 434, 436 may be coupled to a propulsion portion (e.g., 126) of the vehicle 120 (i.e., the outrunner motor 320).

In some embodiments, the remote sensing system 100 may include any appropriate number of mirrors coupled to a propulsion portion of the vehicle 120 (e.g., the outrunner motor 320). In some embodiments (e.g., FIG. 4), three mirrors 432, 434, and 436 are provided. However, in other embodiments a different number of mirrors may be provided, such as four mirrors, five mirrors, or more. For example, for the band structure 430 shown in FIG. 4, a total of nine mirrors may be provided. However, the additional six mirrors may not be shown as positioned on a different side of the band structure 430 and thus obstructed from view by the outrunner motor 320. Returning to FIGS. 1-4, other configurations of mirrors are possible in various embodiments.

In some embodiments, the number of mirrors provided may not be the same as the number of light receivers and light transmitters provided. In some embodiments (e.g., FIG. 4), a total of three mirrors 432, 434, and 436 are provided, a total of three light transmitters 410, 414, and 418 are provided, and a total of three light receivers 412, 416, and 420 are provided. However, in some embodiments, a different number of mirrors may be provided than the number of light transmitters and light receivers that are provided. For example, in some embodiments a total of three light transmitters and three light receivers may be provided, while a total of nine mirrors may be provided. Other configurations of mirrors, light transmitters, and light receivers are possible in various embodiments.

Various sizes of the mirrors 112 may be provided according to various embodiments. In some embodiments, each mirror of the mirrors 112 may be provided as having a same physical size (e.g., a same width and a same height). However, in some embodiments, the mirrors 112 may include mirrors of different physical sizes (e.g., a same height but a different width). Other configurations of mirror sizes are possible in various embodiments.

Various spacings of the mirrors 112 may be provided according to various embodiments. In some embodiments, the mirrors 112 may be equally spaced around the circumference of the propulsion portion to which the mirrors 112 are coupled. For example, the mirrors 112 may be provided on the circumference of a circular cross-section of the propulsion portion to which the mirrors 112 are coupled. With this example, if four mirrors are provided and the width of each mirror covers a 15 degrees sector of the circular cross-section, then each mirror may be provided with a spacing of 75 degrees between the mirror and a next mirror. Thus, the entire 360 degrees of the circular cross-section may be allotted to the mirrors 112 and the spacings between the mirrors 112, with equal spacing being provided between each mirror of the mirrors 112. However, in some embodiments, the mirrors 112 may not be equally spaced around the circumference of the propulsion portion to which the mirrors 112 are coupled. For example, the mirrors 112 may be provided on the circumference of a circular cross-section of the propulsion portion to which the mirrors 112 are coupled. With this example, if four mirrors are provided and the width of each mirror covers a 15 degrees sector of the circular cross-section, then each mirror (except for the last mirror in a sequence of the mirrors 112) may be provided with a spacing of 15 degrees between the mirror and a next mirror. The last mirror in the sequence of the mirrors 112 may be provided with a spacing of 255 degrees between the mirror and a next mirror. Thus, the entire 360 degrees of the circular cross-section may be allotted to the mirrors 112 and the spacings between the mirrors 112, with the mirrors 112 provided closely grouped towards one side of the circumference of the propulsion portion to which the mirrors 112 are coupled. Other configurations of mirror spacings are possible in various embodiments.

In some embodiments, the mirrors 432, 434, 436 may be fixed at different vertical angles. In such embodiments, the different vertical angles of the mirrors 432, 434, 436 may be effective to cause each mirror of the mirrors 432, 434, 436 to reflect a light beam (e.g., as transmitted by the light transmitters 410, 414, 418) in a different vertical direction. For example, the mirror 432 may be fixed at a vertical angle that causes mirror 432 to reflect light beams to a most upwards vertical direction (with respect to the mirrors 434, 436). Continuing the example, the mirror 436 may be fixed at a vertical angle that causes the mirror 436 to reflect light beams to a most downwards vertical direction (with respect to the mirrors 432, 434). Continuing the example, the mirror 434 may be fixed at a vertical angle that causes the mirror 434 to reflect light beams to a middlemost vertical direction (with respect to the mirrors 432, 436). The vertical angles of mirrors 432, 434, 436 may be provided differently in various embodiments.

In some embodiments, the mirrors 432, 434, 436 may be fixed at different horizontal angles with respect to one another. In such embodiments, the different horizontal angles of the mirrors 432, 434, 436 may be effective to cause each mirror of the mirrors 432, 434, 436 to reflect a light beam (e.g., as transmitted by the light transmitters 410, 414, 418) in a different horizontal direction. For example, the mirror 432 may be fixed at a horizontal angle (with respect to the mirrors 434, 436) that causes the mirror 432 to reflect light beams to a most frontwards horizontal direction (with respect to the mirrors 434, 436). Continuing the example, the mirror 436 may be fixed at a horizontal angle (with respect to the mirrors 432, 434) that causes the mirror 436 to reflect light beams to a most rearwards horizontal direction (with respect to the mirrors 432, 434). Continuing the example, the mirror 434 may be fixed at a horizontal angle (with respect to the mirrors 432, 436) that causes the mirror 434 to reflect light beams to a middlemost horizontal direction (with respect to the mirrors 432, 436). The mirrors 432, 434, 436 may not have "fixed" horizontal angles in an absolute sense in that the mirrors 432, 434, 436 may change horizontal angle as the mirrors 432, 434, 436 rotate. However, the horizontal angle of any individual mirror of the mirrors 432, 434, 436 may be considered "fixed" with respect to the other mirrors of 432, 434, 436 given that the mirrors 432, 434, 436 may be fixed in positions with respect to one another. Furthermore, the horizontal angle of any individual mirror of the mirrors 432, 434, 436 may be considered "fixed" with respect to any particular light transmitter of the light transmitters 410, 414, 418 or any particular light receiver of the light receivers 412, 416, 420 given that any individual mirror of the other mirrors of 432, 434, 436 may have the same horizontal angle each time that such mirror is present (e.g., at a defined centered position) in front of any particular such light transmitter or light receiver. The horizontal angles of mirrors 432, 434, 436 may be provided differently in various embodiments.

In some embodiments, rotation of the outrunner motor 320 may cause the light transmitters 410, 414, and 418 to emit light at different mirrors of the mirrors 432, 434, and 436 at different times.

At a first time, the outrunner motor 320 may be at a first angular position (e.g., as shown in FIG. 4). At the first time and first angular position, the mirrors 432, 434, and 436 may be positioned as shown. In particular, at the first time and first angular position, the mirror 432 may be positioned in front of the light transmitter 410 and the light receiver 412; the mirror 434 may be positioned in front of the light transmitter 414 and the light receiver 416; and the mirror 436 may be positioned in front of the light transmitter 418 and the light receiver 420. At the first time, the light transmitter 410 may emit light to be reflected off of the mirror 432; the light transmitter 414 may emit light to be reflected off of the mirror 434; and the light transmitter 418 may emit light to be reflected off of the mirror 436. Each of the light receivers 412, 416, and 420 may receive light reflected back from measuring areas to each of the mirrors 432, 434, and 436, respectively. While the outrunner motor 320 may be rotating in the time period between emission of light from the light transmitters 410, 414, and 418 and reception of reflected light be the light receivers 412, 416, and 420, the change in angular position of the outrunner motor 320 may be small enough so that each of the mirrors 432, 434, and 436 remains substantially positioned in front of the same pair of light transmitter and light receiver during the period of time between light emissions and light reception.

At a second time, the outrunner motor 320 may have rotated counter-clockwise from the first time and the first angular position in order to reach a second angular position. At the second time and second angular position, the mirrors 432, 434, and 436 may be positioned differently (e.g., differently than as shown in FIG. 4). In particular, at the second time and second angular position, the mirror 432 may be positioned in front of the light transmitter 414 and the light receiver 416; the mirror 434 may be positioned in front of the light transmitter 418 and the light receiver 420; and the mirror 436 may be positioned out of view and not in front of any light transmitter or light receiver. In addition, a fourth mirror (not shown) may be positioned in front of the light transmitter 410 and the light receiver 412. At the second time, the light transmitter 410 may emit light to be reflected off of the fourth mirror; the light transmitter 414 may emit light to be reflected off of the mirror 432; and the light transmitter 418 may emit light to be reflected off of the mirror 434. Each of the light receivers 412, 416, and 420 may receive light reflected back from measuring areas to each of the fourth mirror, the mirror 432, and the mirror 434 respectively. While the outrunner motor 320 may be rotating in the time period between emission of light from the light transmitters 410, 414, and 418 and reception of reflected light be the light receivers 412, 416, and 420, the change in angular position of the outrunner motor 320 may be small enough so that each of the fourth mirror, the mirror 432, and the mirror 434 remains substantially positioned in front of the same pair of light transmitter and light receiver during the period of time between light emissions and light reception.

At a third time, the outrunner motor 320 may have rotated counter-clockwise from the second time and the second angular position in order to reach a third angular position. At the third time and third angular position, the mirrors 432, 434, and 436 may be positioned differently (e.g., differently than as shown in FIG. 4). In particular, at the third time and third angular position, the mirror 432 may be positioned in front of the light transmitter 418 and the light receiver 420; the mirror 434 may be positioned out of view and not in front of any light transmitter or light receiver; and the mirror 436 may be positioned out of view and not in front of any light transmitter or light receiver. In addition, the fourth mirror (not shown) may be positioned in front of the light transmitter 414 and the light receiver 416; and a fifth mirror (not shown) may be positioned in front of the light transmitter 410 and the light receiver 412. At the third time, the light transmitter 410 may emit light to be reflected off of the fifth mirror; the light transmitter 414 may emit light to be reflected off of the fourth mirror; and the light transmitter 418 may emit light to be reflected off of the mirror 432. Each of the light receivers 412, 416, and 420 may receive light reflected back from measuring areas to each of the fifth mirror, the fourth mirror, and the mirror 432 respectively. While the outrunner motor 320 may be rotating in the time period between emission of light from the light transmitters 410, 414, and 418 and reception of reflected light be the light receivers 412, 416, and 420, the change in angular position of the outrunner motor 320 may be small enough so that each of the fifth mirror, the fourth mirror, and the mirror 432 remains substantially positioned in front of the same pair of light transmitter and light receiver during the period of time between light emissions and light reception.

In some embodiments, the outrunner motor 320 may continue rotating to further times and further angular positions. In such embodiments, the mirrors 432, 434, and 436 and additional mirrors may continue changing positions with respect to positioning in front of the light transmitters 410, 414, and 418 and the light receivers 412, 416, and 420.

In some embodiments, the rotational sensor 108 may be configured to determine the angular position of the outrunner motor 320 and generate a first rotational data signal based on this determination. For example, the rotational data signal may indicate that the outrunner motor 320 is in the first angular position when the light transmitter 410 emitted light off of the mirror 432 and when the light receiver 412 received light from the mirror 432. The processor 110 may be configured to receive this first rotational data signal in addition to a first remote sensing data signal generated based on the light emission and light reception by the light transmitter 410 and the light receiver 412 at the first time. In some embodiments, the first remote sensing data signal may contain a time or distance value but no indication of a mirror (e.g., one of the mirrors 432, 434, or 436) or a vertical angle (e.g., as corresponding to the mirrors 432, 434, or 436). As such, the processor 110 may not be capable of determining a vertical angle for the first remote sensing data signal in absence of the first rotational data signal. However, in some embodiments, the processor 110 may use the indication of the first angular position provided by the first rotational data signal to determine (e.g., using a mapping of mirror positions relative to light transmitters/light receivers to angular positions of the outrunner motor 320) that the mirror 432 was positioned in front of the light transmitter 410 and the light receiver 412 when the time or distance value contained in first remote sensing data signal was observed. The processor 110 may determine a vertical angle for the first remote sensing data signal based on a known fixed vertical angle of the mirror 432 (e.g., as stored in a mapping table in a memory coupled to the processor 110). In this way, the processor 110 may use a rotational data signal in order to process time or distance information contained in a remote sensing data signal. In some embodiments, the angular position indication or other rotational information generated by the rotational sensor 108 may be included as part of the remote sensing data signal. In this way, the processor 110 may associate remote sensing information with rotational information based on the remote sensing information and the rotational information being included in a single signal. In other embodiments, the remote sensing data signal and the rotational data signal may be distinct signals separately received by the processor 110. In such embodiments, the processor 110 may associate a rotational data signal with a remote sensing data signal based on the rotational data signal having a same or similar timestamp value as the remote sensing data signal.

FIGS. 5A, 5B, and 5C are diagrams of arrangements of components of the remote sensing system 100 according to some embodiments. With reference to FIGS. 1-5C, mirrors of the remote sensing system 100 may be provided at different fixed angles that cause the mirrors to reflect light from the light transmitter 102 in different vertical directions.

In some embodiments, the remote sensing system 100 may include mirrors 522, 524, and 526. The mirrors 522, 524, 526 may be provided as described for the mirrors 112 (432, 434, 436). The mirrors 522, 524, 526 may be coupled to the propulsion portion 126. The propulsion portion 126 may rotate about an axis 510. The axis 510 may be referred to as a vertical axis in embodiments where the axis 510 extends up and down in a vertical direction.

In some embodiments, the mirror 522 may be fixed at a vertical angle that causes a light beam 530 (which may correspond to 212) emitted by the light transmitter 102 to be reflected as a reflected beam 532 (which may correspond to 214) to a point 542 where the reflected beam 532 strikes the measuring area 140. In some embodiments, the mirror 524 may be fixed at a vertical angle that causes the light beam 530 emitted by the light transmitter 102 to be reflected as a reflected beam 534 (which may correspond to 214) to a point 544 where the reflected beam 534 strikes the measuring area 140. In some embodiments, the mirror 526 may be fixed at a vertical angle that causes the light beam 530 emitted by the light transmitter 102 to be reflected as a reflected beam 536 (which may correspond to 214) to a point 546 where the reflected beam 536 strikes the measuring area 140.

The vertical angle of the mirror 526 may cause the light beam 530 emitted by the light transmitter 102 to have a largest angle of incidence (i.e., closer to 90 degrees than zero degrees) when compared to the angles of incidence created by the mirrors 522, 524. Therefore, the reflected beam 536 may strike the measuring area 140 at a highest or most upward vertical point (i.e., the point 546) when compared to the points 542, 544. Stated more generally, the angle of the mirror 526 with respect to the axis 510 may cause the mirror 526 to reflect light (i.e., the reflected beam 532) to a furthest point in one direction along the axis 510.

The vertical angle of the mirror 524 may cause the light beam emitted by the light transmitter 102 to have a smallest angle of incidence (i.e., closer to zero degrees than 90 degrees) when compared to the angles of incidence created by the mirrors 522, 526. Therefore, the reflected beam 534 may strike the measuring area 140 at a lowest or most downward vertical point (i.e., the point 544) when compared to the points 542, 546. Stated more generally, the angle of the mirror 524 with respect to the axis 510 may cause the mirror 524 to reflect light (i.e., the reflected beam 534) to a furthest point in one direction along the axis 510.

The vertical angle of the mirror 522 may cause the light beam emitted by the light transmitter 102 to have a middlemost angle of incidence (i.e., between the largest and smallest angles of incidence) when compared to the angles of incidence created by the mirrors 524, 526. Therefore, the reflected beam 532 may strike the measuring area 140 at a middlemost or most central vertical point (i.e., the point 542) when compared to the points 544, 546. Stated more generally, the angle of the mirror 522 with respect to the axis 510 may cause the mirror 522 to reflect light (i.e., the reflected beam 532) to a point that is not the furthest in either direction along the axis 510.

By providing the mirrors 112 of the remote sensing system 100 at varying angles with respect to the axis of rotation 510 of the propulsion portion 126, the remote sensing system 100 may be able to transmit/receive light (and thus determine distances) in numerous directions with respect to the axis of rotation 510 of the propulsion portion 126. Nonetheless, the remote sensing system 100 may be capable of achieving this without requiring a dedicated motor to change the angles of the mirrors 112 with respect to the axis of rotation 510 of the propulsion portion 126.

FIGS. 6A, 6B, and 6C are diagrams of angles of the mirrors of the remote sensing system 100 according to some embodiments. With reference to FIGS. 1-6C, the mirrors 522, 524, 526 of the remote sensing system 100 may be specified as having different angles with respect to the axis of rotation 510 of the propulsion portion 126. In some embodiments, the mirror 522 may be provided parallel to the axis 510. As such, there may be no angular difference between the mirror 522 and the axis 510. In some embodiments, the mirror 524 may be provided at an angle 614 to the axis 510. As such, the angular difference 614 between the mirror 524 and the axis 510 may cause the mirror 524 to reflect a light beam from the light transmitter 102 in a different direction (with respect to axis 510) than does the mirror 522. In some embodiments, the mirror 526 may be provided at an angle 616 to the axis 510. As such, the angular difference 616 between the mirror 526 and the axis 510 may cause the mirror 526 to reflect a light beam from the light transmitter 102 in a different direction (with respect to axis 510) than do the mirrors 522, 524.

In some embodiments, the axis of rotation 510 may be a first axis, and the mirrors 522, 524, and 526 may be described as being provided at varying angles relative to the first axis (i.e., the axis 510). A first angle may be an angle at which the mirror 522 is provided relative to the first axis (i.e., the axis 510). Because the mirror 522 may be provided substantially parallel to the first axis (i.e., the axis 510), the first angle may be provided as zero degrees or 180 degrees. A second angle may be an angle at which the mirror 524 is provided relative to the first axis (i.e., the axis 510). As such, the second angle may be provided as the angle 614. A third angle may be an angle at which the mirror 524 is provided relative to the first axis (i.e., the axis 510). As such, the third angle may be provided as the angle 616. In some embodiments, the first angle, the second angle (i.e., the angle 614), and the third angle (i.e., the angle 616) may each be different from one another. In some embodiments, the first angle, the second angle (i.e., the angle 614), and the third angle (i.e., the angle 616) may not each be different from one another, but the first angle, the second angle (i.e., the angle 614), and the third angle (i.e., the angle 616) may nonetheless not all be the same. In some embodiments, more than three mirrors 522, 524, and 526 may be provided. In such embodiments, each of the additional mirrors beyond the mirrors 522, 524, and 526 may be provided at additional angles relative to the first axis (i.e., the axis 510). Alternatively in such embodiments, each of the additional mirrors beyond the mirrors 522, 524, and 526 may be provided at one of the first angle, the second angle (i.e., the angle 614), and the third angle (i.e., the angle 616). Other configurations of mirrors provided at angles relative to the first axis are possible in various embodiments.

Figure 7:
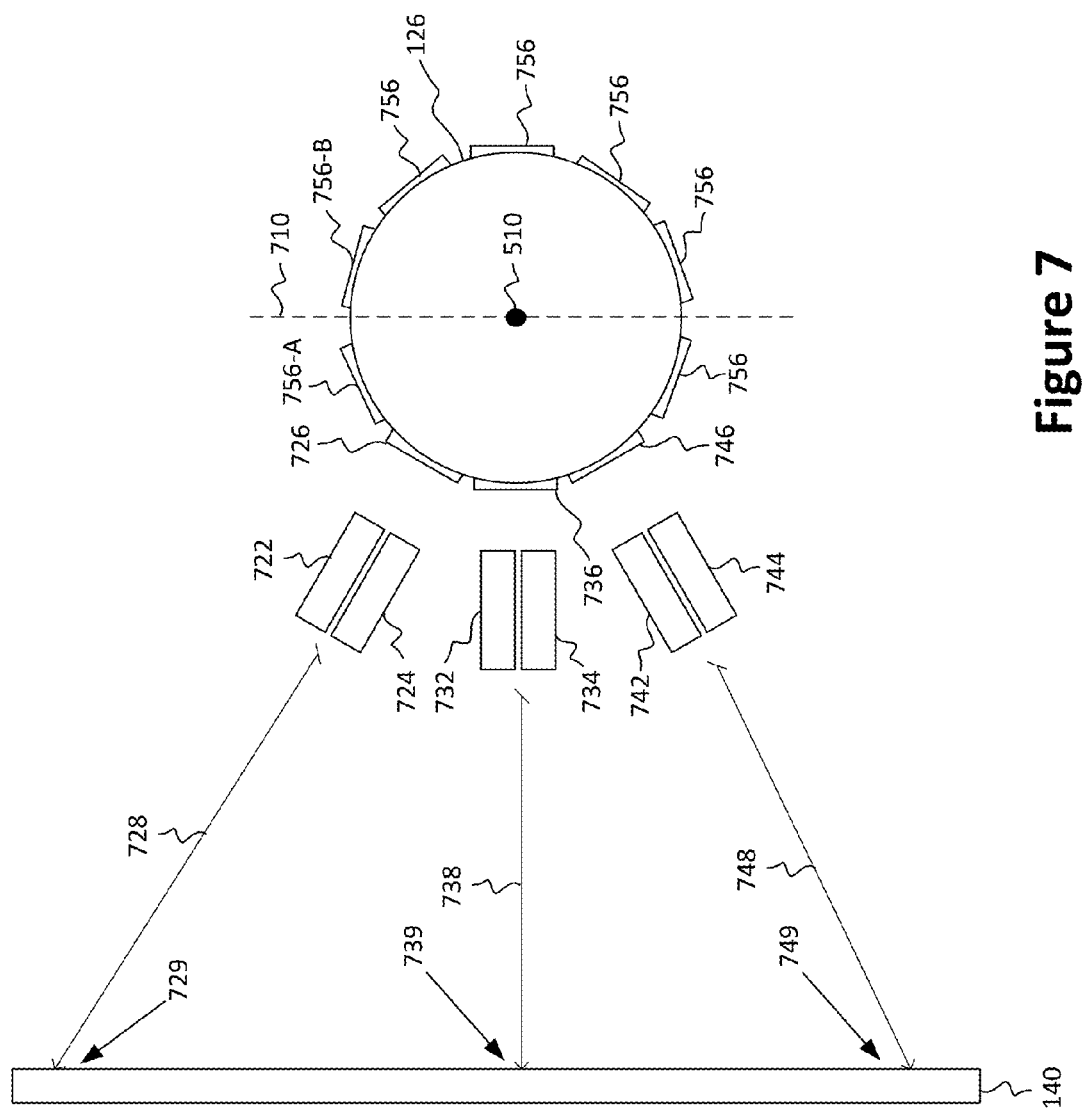
FIG. 7 is a diagram of an arrangement of components of a remote sensing system according to some embodiments.

FIG. 7 is a diagram of an arrangement of components of the remote sensing system 100 according to some embodiments. With reference to FIGS. 1-7, the mirrors of the remote sensing system 100 may be provided at different fixed angles that cause the mirrors to reflect light from the light transmitter 102 in different horizontal directions.

In some embodiments, the remote sensing system 100 may include three pairs (or any other suitable number) of light transmitters/receivers: a light transmitter 722 and a light receiver 724; a light transmitter 732 and a light receiver 734; and a light transmitter 742 and a light receiver 744. The light transmitters 722, 732, 742 may be provided as described for the light transmitter 102 (or 410, 414, 418). The light receivers 724, 734, 744 may be provided as described for the light receiver 104 (or 412, 416, 420).

The propulsion portion 126 may rotate about the axis 510. In FIG. 7, the axis 510 is shown from above (i.e., going into the page). With reference to FIGS. 1-7, an axis 710 may be parallel to the axis 510 on some plane. The axis 710 may be referred to as a horizontal axis in embodiments where the axis 710 extends frontwards and rearwards or side to side in a direction perpendicular to a vertical axis.

In some embodiments, the remote sensing system 100 may include mirrors 726, 736, 746, and 756. The mirrors 726, 736, 746, 756 may be provided as described for the mirrors 112 (or 432, 434, 436; or 522, 524, 526). The mirrors 726, 736, 746, 756 may be coupled to the propulsion portion 126 in any suitable manner.

In some embodiments, the mirror 726 may be fixed at a horizontal angle that causes a light beam (e.g., 212) emitted by the light transmitter 722 to be reflected as a reflected beam 728 (which may correspond to 214) to a point 729 where the reflected beam 728 strikes the measuring area 140. In some embodiments, the mirror 736 may be fixed at a horizontal angle that causes a light beam emitted by the light transmitter 732 to be reflected as a reflected beam 738 to a point 739 where the reflected beam 738 strikes the measuring area 140. In some embodiments, the mirror 746 may be fixed at a horizontal angle that causes a light beam emitted by the light transmitter 742 to be reflected as a reflected beam 748 to a point 749 where the reflected beam 748 strikes the measuring area 140. In FIG. 7, reflected beams 728, 738, and 748 are only partially shown.

With reference to FIGS. 1-7, in some embodiments, while the horizontal angle of each mirror of the mirrors 726, 736, 746, 756 may change as the propulsion portion 126 rotates, the horizontal angle of each mirror of the mirrors 726, 736, 746, and 756 may be fixed with respect to the horizontal angles of the other mirrors. As such, each mirror of the mirrors 726, 736, 746, 756 may reflect light from a light transmitter of the light transmitters 722, 732, 742 at a different angle with respect to the horizontal axis 710. In this way, if the light transmitter 722 reflects light off of the mirror 726, while the light transmitter 732 reflects light off of the mirror 736, while the light transmitter 742 reflects light off of the mirror 746, each of the reflected beams 728, 738, 748, respectively, may be reflected at different angles with respect to the horizontal axis 710. Accordingly, the remote sensing system 100 may be able to transmit/receive light (and thus determine distances) in numerous directions with respect to an axis perpendicular to the axis of rotation of the propulsion portion 126. Nonetheless, the remote sensing system 100 may be capable of achieving this without requiring a dedicated motor to change the angles of the mirrors 112 with respect to the axis 710 perpendicular to the axis of rotation 510 of the propulsion portion 126.

In some embodiments, rotation of the propulsion portion 126 may cause the light transmitters 722, 732, 742 to emit light at different mirrors of the mirrors 726, 736, 746, and 756 at different times.

At a first time, the propulsion portion 126 may be at a first angular position (e.g., as shown in FIG. 7). At the first time and first angular position, the mirrors 726, 736, and 746 may be positioned as shown. In particular, at the first time and first angular position, the mirror 726 may be positioned in front of the light transmitter 722 and the light receiver 724; the mirror 736 may be positioned in front of the light transmitter 732 and the light receiver 734; and the mirror 746 may be positioned in front of the light transmitter 742 and the light receiver 744. At the first time, the light transmitter 722 may emit light to be reflected off of the mirror 726; the light transmitter 732 may emit light to be reflected off of the mirror 736; and the light transmitter 742 may emit light to be reflected off of the mirror 746. Each of the light receivers 724, 734, 744 may receive light reflected back from measuring areas to each of the mirrors 726, 736, 746, respectively. While the propulsion portion 126 may be rotating in the time period between emission of light from the light transmitters 722, 732, 742 and reception of reflected light be the light receivers 724, 734, 744, the change in angular position of the propulsion portion 126 may be small enough so that each of the mirrors 726, 736, 746 remains substantially positioned in front of the same pair of light transmitter and light receiver during the period of time between light emissions and light reception.

At a second time, the propulsion portion 126 may have rotated counter-clockwise from the first time and the first angular position in order to reach a second angular position. At the second time and second angular position, the mirrors 726, 736, 746 may be positioned differently (e.g. differently than as shown in FIG. 7). In particular, at the second time and second angular position, the mirror 726 may be positioned in front of the light transmitter 732 and the light receiver 734; the mirror 736 may be positioned in front of the light transmitter 742 and the light receiver 744; and the mirror 746 may be positioned not in front of any light transmitter or light receiver. In addition, the mirror 756-A may be positioned in front of the light transmitter 722 and the light receiver 724. At the second time, the light transmitter 722 may emit light to be reflected off of the mirror 756-A; the light transmitter 732 may emit light to be reflected off of the mirror 726; and the light transmitter 742 may emit light to be reflected off of the mirror 736. Each of the light receivers 724, 734, 744 may receive light reflected back from measuring areas to each of the mirror 756-A, the mirror 726, and the mirror 736 respectively. While the propulsion portion 126 may be rotating in the time period between emission of light from the light transmitters 722, 732, 742 and reception of reflected light be the light receivers 724, 734, 744, the change in angular position of the propulsion portion 126 may be small enough so that each of the mirror 756-A, the mirror 726, and the mirror 736 remains substantially positioned in front of the same pair of light transmitter and light receiver during the period of time between light emissions and light reception.

At a third time, the propulsion portion 126 may have rotated counter-clockwise from the second time and the second angular position in order to reach a third angular position. At the third time and third angular position, the mirrors 726, 736, 746, 756 may be positioned differently (e.g., differently than as shown in FIG. 7). In particular, at the third time and third angular position, the mirror 726 may be positioned in front of the light transmitter 742 and the light receiver 744; the mirror 736 may be positioned not in front of any light transmitter or light receiver; and the mirror 746 may be positioned not in front of any light transmitter or light receiver. In addition, the mirror 756-A may be positioned in front of the light transmitter 732 and the light receiver 734; and the mirror 756-B may be positioned in front of the light transmitter 722 and the light receiver 724. At the third time, the light transmitter 722 may emit light to be reflected off of the mirror 756-B; the light transmitter 732 may emit light to be reflected off of the mirror 756-A; and the light transmitter 742 may emit light to be reflected off of the mirror 726. Each of the light receivers 724, 734, 744 may receive light reflected back from measuring areas to each of the mirror 756-B, the mirror 756-A, and the mirror 726 respectively. While the propulsion portion 126 may be rotating in the time period between emission of light from the light transmitters 722, 732, 742 and reception of reflected light be the light receivers 724, 734, 744, the change in angular position of the propulsion portion 126 may be small enough so that each of the mirror 756-B, the mirror 756-A, and the mirror 726 remains substantially positioned in front of the same pair of light transmitter and light receiver during the period of time between light emissions and light reception.

In some embodiments, the propulsion portion 126 may continue rotating to further times and further angular positions. In such embodiments, the mirrors 726, 736, 746 may continue changing positions with respect to positioning in front of the light transmitters 722, 732, and 742 and the light receivers 724, 734, and 744.

Figure 8A:
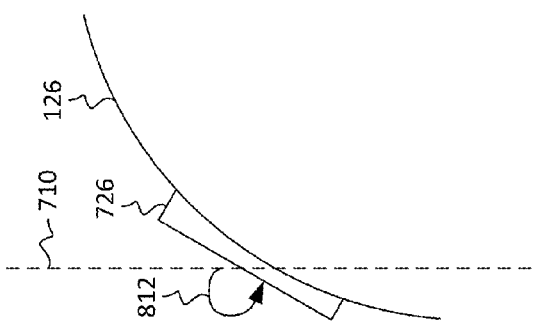
FIGS. 8A, 8B, and 8C are diagrams of angles of mirrors of a remote sensing system according to some embodiments.
Figure 8B:
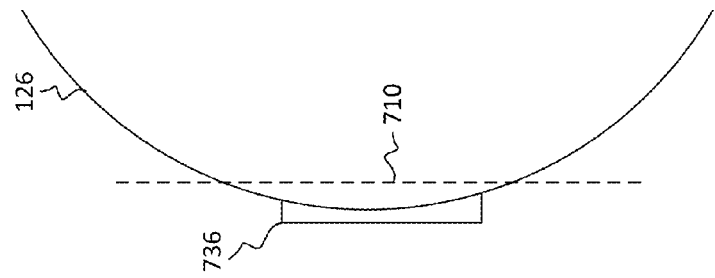
Figure 8C:
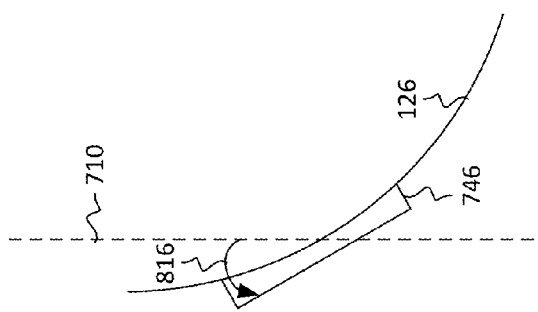

FIGS. 8A, 8B, and 8C are diagrams of angles of the mirrors of the remote sensing system 100 according to some embodiments. With reference to FIGS. 1-8C, the mirrors of the remote sensing system 100 may be specified as having different angles with respect to the horizontal axis 710 that is perpendicular to the axis of rotation 510 of the propulsion portion 126. In some embodiments, the mirror 736 may be provided parallel to the axis 710. As such, there may be no angular difference between the mirror 736 and the axis 710. In some embodiments, the mirror 726 may be provided at an angle 812 to the axis 710. As such, the angular difference 812 between the mirror 726 and the axis 710 may cause the mirror 726 to reflect a light beam from the light transmitter 722 in a different direction (with respect to axis 710) than the mirror 736 reflects a light beam from the light transmitter 732. In some embodiments, the mirror 746 may be provided at an angle 816 to the axis 710. As such, the angular difference 816 between the mirror 746 and the axis 710 may cause the mirror 746 to reflect a light beam from the light transmitter 742 in a different direction (with respect to axis 710) than the mirror 726 reflects a light beam from the light transmitter 722 and in a different direction (with respect to axis 710) than the mirror 736 reflects a light beam from the light transmitter 732.

In some embodiments, the horizontal axis 710 may be a second axis that is perpendicular to a first axis (e.g., the axis 510), and the mirrors 726, 736, and 746 may be described as being provided at varying angles relative to the second axis (i.e., the axis 710). Where first, second, and third angles are provided relative to the first axis (e.g., the axis 510), the mirrors 726, 736, and 746 may be described as being provided at fourth, fifth, and sixth angles, respectively, relative to the second axis (i.e., the axis 710). A fourth angle may be an angle at which the mirror 726 is provided relative to the second axis (i.e., the axis 710). As such, the fourth angle may be provided as the angle 812. The fifth angle may be an angle at which the mirror 736 is provided relative to the second axis (i.e., the axis 710). Because the mirror 736 may be provided substantially parallel to the second axis (i.e., the axis 710), the fifth angle may be provided as zero degrees or 180 degrees. A sixth angle may be an angle at which the mirror 746 is provided relative to the second axis (i.e., the axis 710). As such, the sixth angle may be provided as the angle 816. In some embodiments, the fourth angle (i.e., the angle 812), the fifth angle, and the sixth angle (i.e., the angle 816) may each be different from one another. In some embodiments, the fourth angle (i.e., the angle 812), the fifth angle, and the sixth angle (i.e., the angle 816) may not each be different from one another, but the fourth angle (i.e., the angle 812), the fifth angle, and the sixth angle (i.e., the angle 816) may nonetheless not all be the same. Other configurations of mirrors provided at angles relative to the second axis are possible in various embodiments.

Figure 9:
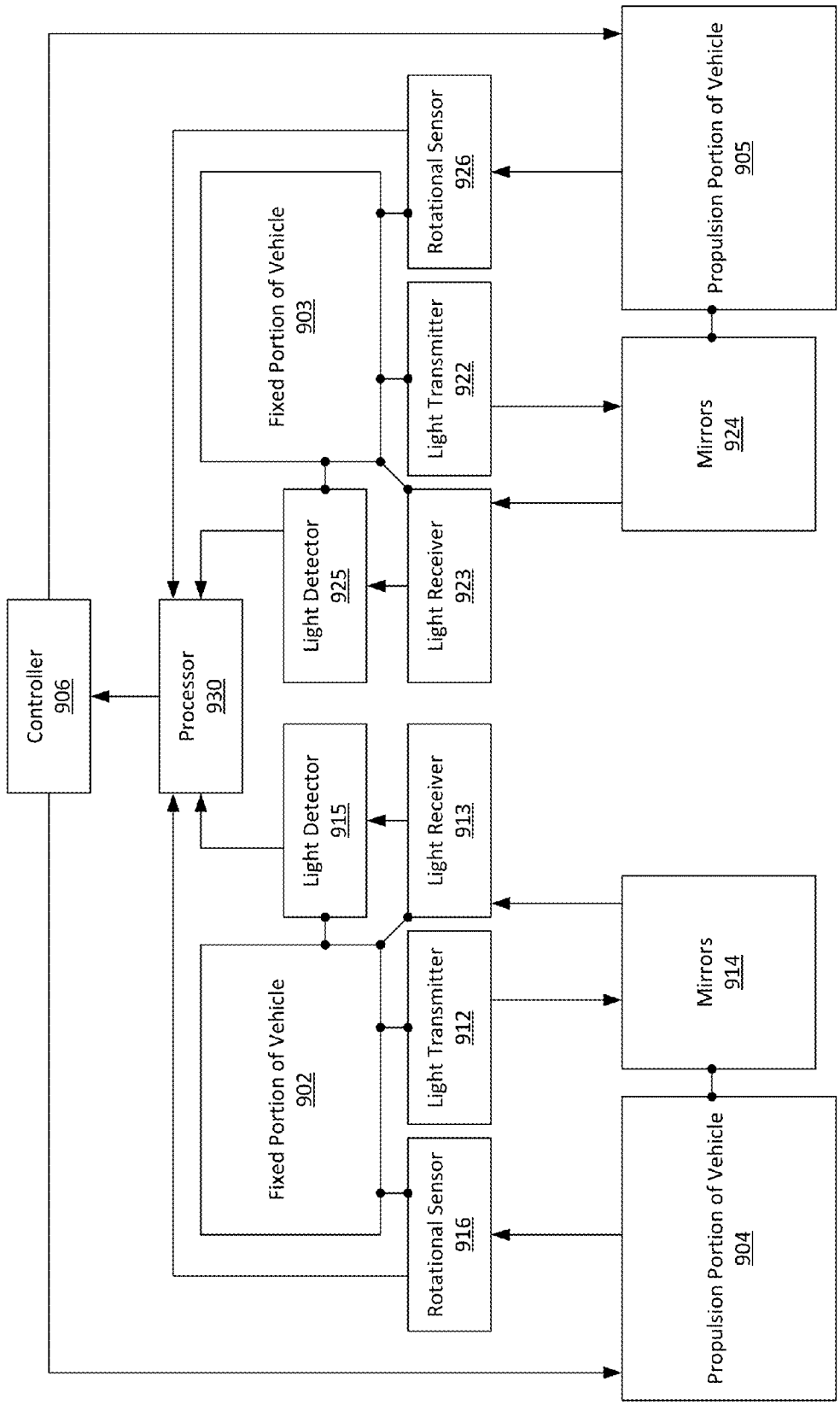
FIG. 9 is a schematic diagram of a vehicle and a remote sensing system according to some embodiments.

FIG. 9 is a schematic diagram of the remote sensing system 100 and the vehicle 120 according to some embodiments. With reference to FIGS. 1-9, the remote sensing system 100 may include components coupled to multiple propulsion portions and multiple fixed portions of the vehicle 120.

In some embodiments, the vehicle 120 may include a controller 906, a fixed portion 902, a fixed portion 903, a propulsion portion 904, and a propulsion portion 905. The controller 906 may be provided as described for the controller 124. The fixed portions 902, 903 may be provided as described for the fixed portion 122. The propulsion portions 904, 905 may be provided as described for propulsion portion 126. In some embodiments, the controller 906 may control each of the propulsion portions 904, 905. The controller 906 may transmit control signals to the propulsion portions 904, 905 in order to control the operation of the propulsion portions 904, 905.

In some embodiments, the remote sensing system 100 may include a light transmitter 912, a light receiver 913, mirrors 914, a light detector 915, a rotational sensor 916, a light transmitter 922, a light receiver 923, mirrors 924, a light detector 925, a rotational sensor 926, and a processor 930. The light transmitters 912, 922 may be provided as described for the light transmitter 102. The light receivers 913, 923 may be provided as described for the light receiver 104. The mirrors 914, 924 may be provided as described for the mirrors 112. The light detectors 915, 925 may be provided as described for the light detector 106. The rotational sensors 916, 926 may be provided as described for the rotational sensor 108. The processor 930 may be provided as described for the processor 110.

In some embodiments, components of the remote sensing system 100 may be coupled to one or more fixed portions of the vehicle 120. For example, the light transmitter 912, the light receiver 913, the light detector 915, and the rotational sensor 916 may be coupled to the fixed portion 902. Continuing the example, the light transmitter 922, the light receiver 923, the light detector 925, and the rotational sensor 926 may be coupled to the fixed portion 903. In some embodiments, the fixed portion 902 and the fixed portion 903 may be distinct physical components of the vehicle 120. In some embodiments, the fixed portion 902 and the fixed portion 903 may be distinct parts of a single physical component of the vehicle 120. In some embodiments, the fixed portion 902 and the fixed portion 903 may be the same part of the same physical component of the vehicle 120.

In some embodiments, components of the remote sensing system 100 may be coupled to one or more propulsion portions of the vehicle 120. For example, the mirrors 914 may be coupled to the propulsion portion 904. Continuing the example, the mirrors 924 may be coupled to the propulsion portion 905. In some embodiments, the propulsion portion 904 and the propulsion portion 905 may be distinct physical components of the vehicle 120. In some embodiments, the propulsion portion 904 and the propulsion portion 905 may be distinct parts of a single physical component of the vehicle 120. In some embodiments, the propulsion portion 904 and the propulsion portion 905 may be the same part of the same physical component of the vehicle 120.

In some embodiments, the processor 930 may be further configured to process rotational data signals from more than one rotational sensor. The processor 930 may be configured to process rotational data signals received from both the rotational sensor 916 and the rotational sensor 926.

In some embodiments, the processor 930 may be configured to process information from more than one group of light transmitter, light receiver, and light detector. The processor 930 may be configured to process remote sensing data signals received from both the light detector 915 and the light detector 925. The remote sensing data signals received from the light detector 915 may be generated by the light detector 915 independent of the light detector 925. Similarly, remote sensing data signals received from the light detector 925 may be generated by the light detector 925 independent of the light detector 915. In some embodiments, the remote sensing data signals received from the light detector 915 may pertain to a different measuring area than do pertain the remote sensing data signals received from the light detector 925. In some embodiments, the remote sensing data signals received from the light detector 915 may pertain to a same measuring area as do pertain the remote sensing data signals received from the light detector 925. In some embodiments, the remote sensing data signals received from the light detector 915 may pertain to an overlapping measuring area as do pertain the remote sensing data signals received from the light detector 925.

In embodiments where the processor 930 processes remote sensing data signals received from both the light detector 915 and the light detector 925, the processor 930 may generate a composite signal containing determined distance and direction information that is based on processing both the remote sensing data signals received from the light detector 915 and the remote sensing data signals received from the light detector 925. In such embodiments, the processor 930 may transmit the composite signal to the controller 906. The controller 906 may use the distance and direction information included in the composite signal in order to navigate the vehicle 120 through a surrounding environment.

Figure 10:
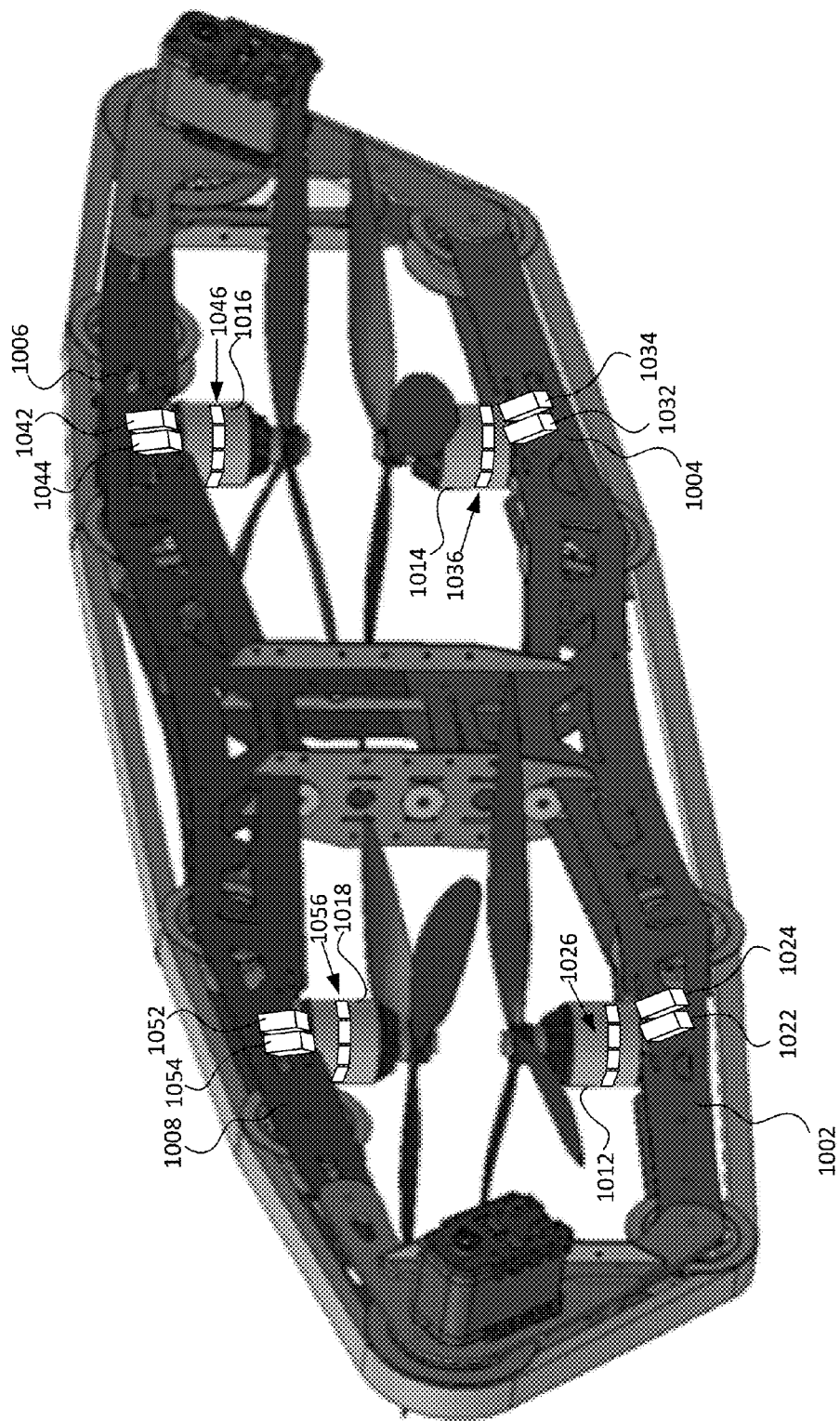
FIG. 10 is a perspective diagram of a vehicle and a remote sensing system according to some embodiments.

FIG. 10 is a perspective diagram of the vehicle 120 and the remote sensing system 100 according to some embodiments. With reference to FIGS. 1-10, the vehicle 120 may be an unmanned aerial/ground vehicle with components of the remote sensing system 100 attached to multiple propeller motors of the vehicle 120.

In some embodiments, the vehicle 120 may be an unmanned aerial/ground vehicle. The vehicle 120 may have frame portions 1002, 1004, 1006, and 1008. The frame portions 1002, 1004, 1006, 1008 may be fixed portions as described (e.g., fixed portions 122, 902, 903). The vehicle 120 may have outrunner motors 1012, 1014, 1016, and 1018 that drive propellers. The propellers as driven by the outrunner motors 1012, 1014, 1016, 1018 may cause the vehicle 120 to be propelled through the air by providing a lifting force. The outrunner motors 1012, 1014, 1016, 1018 may be propulsion portions as described (e.g., propulsion portions 126, 904, 905).

In some embodiments, components of the remote sensing system 100 may be coupled to the unmanned aerial/ground vehicle 120. A light transmitter 1022 and a light receiver 1024 may be coupled to the frame portion 1002. A light transmitter 1032 and a light receiver 1034 may be coupled to the frame portion 1004. A light transmitter 1042 and a light receiver 1044 may be coupled to the frame portion 1006. A light transmitter 1052 and a light receiver 1054 may be coupled to the frame portion 1008. Mirrors 1026 may be coupled to the outrunner motor 1012. Mirrors 1036 may be coupled to the outrunner motor 1014. Mirrors 1046 may be coupled to the outrunner motor 1016. Mirrors 1056 may be coupled to the outrunner motor 1018.

Figure 11:
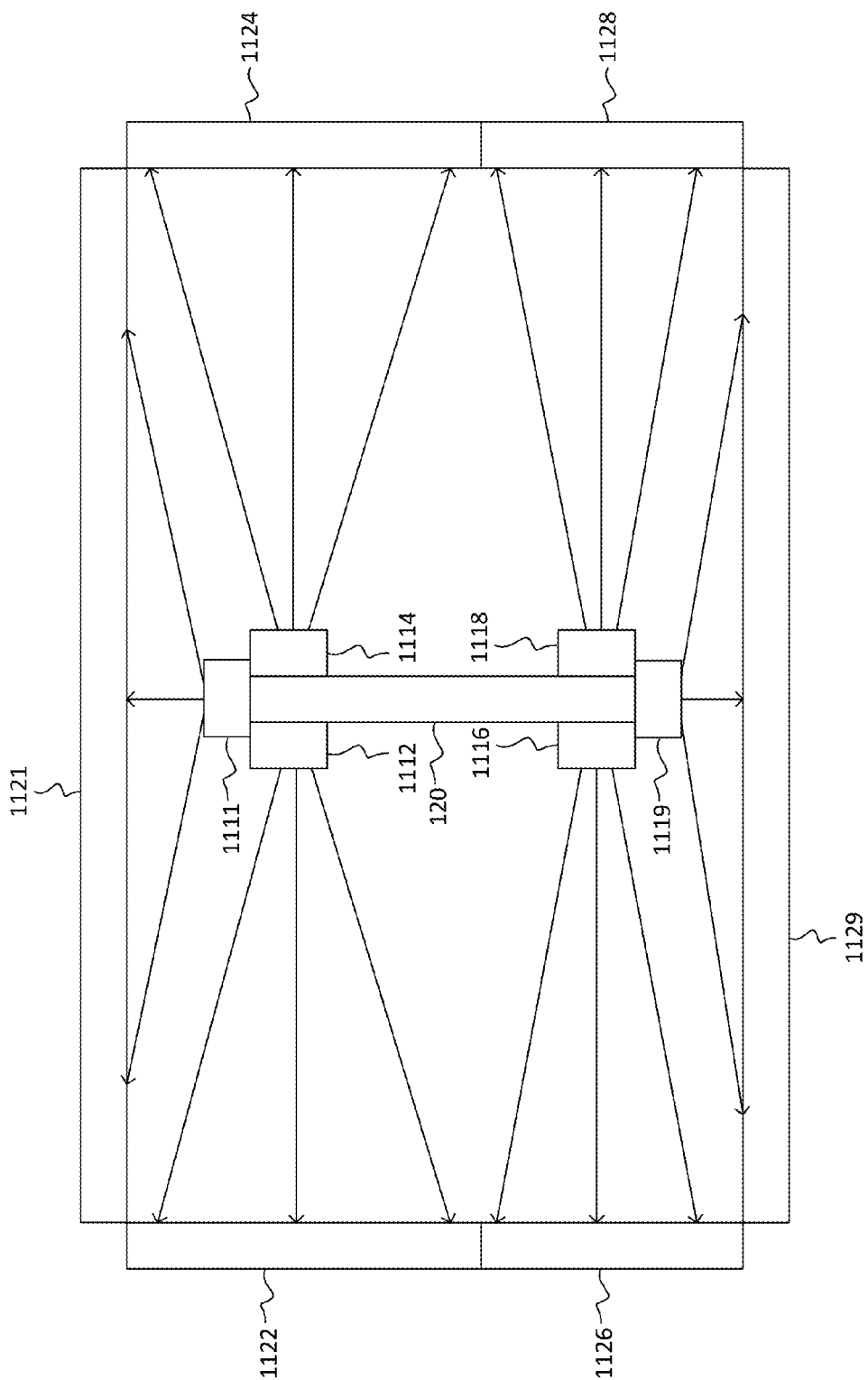
FIG. 11 is a schematic diagram of a vehicle and a remote sensing system according to some embodiments.

FIG. 11 is a schematic diagram of the vehicle 120 and the remote sensing system 100 according to some embodiments. With reference to FIGS. 1-11, the remote sensing system 100 may include multiple groups of components in order to determine distance and direction information for multiple directions around the vehicle 120.

In some embodiments, the remote sensing system 100 may include component groups 1111, 1112, 1114, 1116, 1118, and 1119. Each component group of the component groups 1111, 1112, 1114, 1116, 1118, 1119 may include a light transmitter (e.g., the light transmitter 102), a light receiver (e.g., the light receiver 104), a light detector (e.g., the light detector 106), a rotational sensor (e.g., the rotational sensor 108), and mirrors (e.g., the mirrors 112). In some embodiments, each component group of the component groups 1111, 1112, 1114, 1116, 1118, 1119 may include mirrors coupled to a separate propulsion portion (e.g., the propulsion portion 126) of the vehicle 120. In some embodiments, the mirrors of component groups 1111, 1112, 1114 may be coupled to a first propulsion portion of the vehicle 120 while the mirrors of component groups 1116, 1118, 1119 may be coupled to a second propulsion portion of the vehicle 120.

In some embodiments, the component groups 1111, 1112, 1114, 1116, 1118, 1119 may transmit light to and receive light from numerous measuring areas. The component group 1111 may transmit light to and receive light from measuring area 1121. The component group 1112 may transmit light to and receive light from measuring area 1122. The component group 1114 may transmit light to and receive light from measuring area 1124. The component group 1116 may transmit light to and receive light from measuring area 1126. The component group 1118 may transmit light to and receive light from measuring area 1128. The component group 1119 may transmit light to and receive light from measuring area 1129. Based on such a configuration, a processor (e.g., the processor 110 or 930) may receive remote sensing data signals from each component group of the component groups 1111, 1112, 1114, 1116, 1118, 1119. Therefore, the processor may generate distance and direction information for multiple areas around the vehicle 120. In some embodiments, the processor may generate distance and direction information for all or substantially all areas around the vehicle. In some embodiments, the remote sensing system 100 may be able to generate distance and direction information about the environment around the vehicle 120 without the presence of gaps or blind spots in the distance and direction information. Such embodiments may be particularly beneficial to the vehicle 120 if the vehicle 120 travels through fluids (e.g., air or water) or over rough terrain (e.g., off-road), as obstacles in the environment of the vehicle 120 may be encountered from any direction around the vehicle 120.

Figures 12, 13:
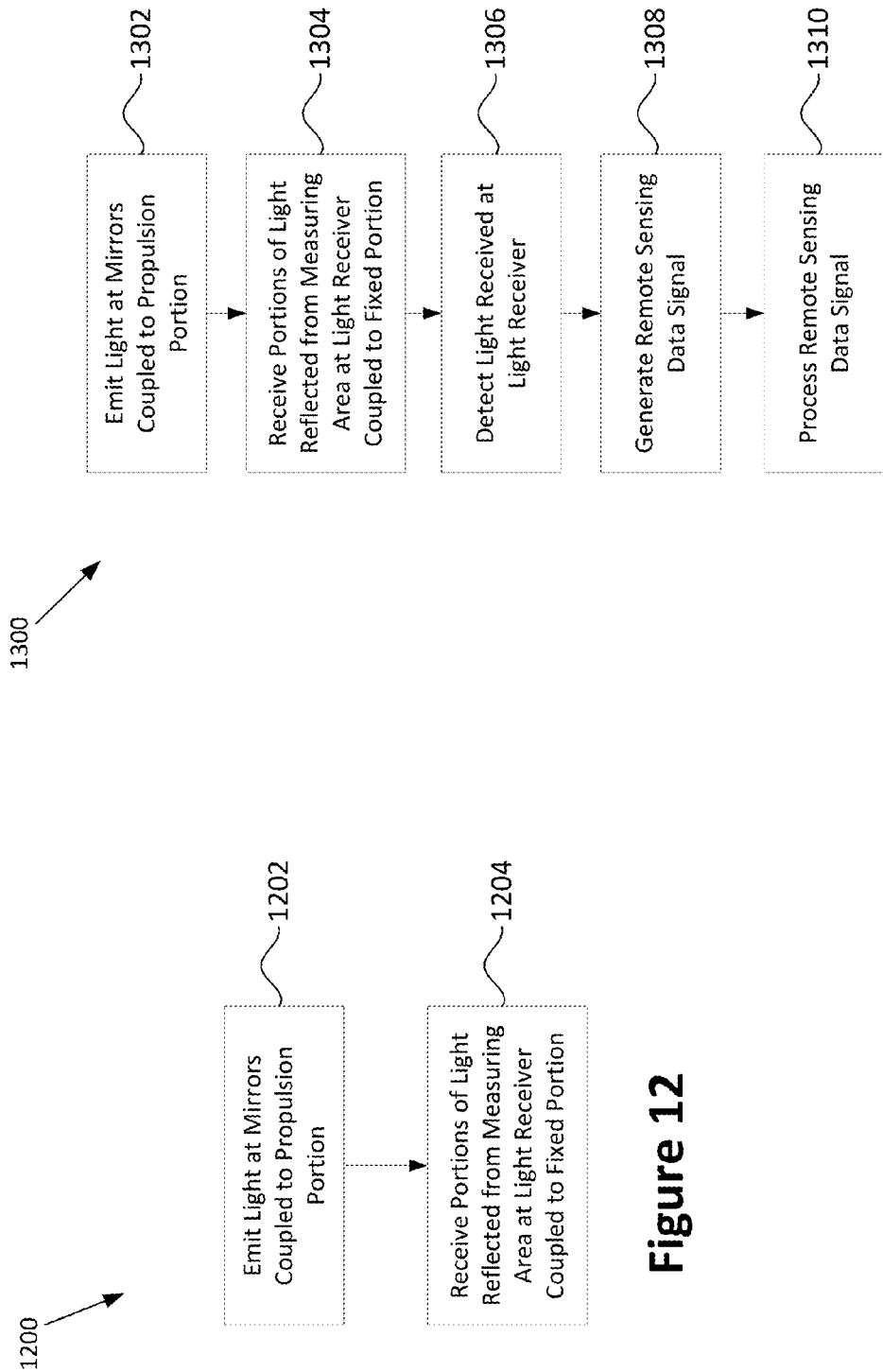
FIG. 12 is a flow diagram of a process for remote sensing according to some embodiments.
FIG. 13 is a flow diagram of a process for remote sensing according to some embodiments.

FIG. 12 is a flow diagram of a process 1200 for remote sensing according to some embodiments. The process 1200 is described with reference to FIGS. 1-12. The process 1200 may be performed by a remote sensing system (e.g., the remote sensing system 100) as described.

At block 1202, light is emitted at mirrors (e.g., the mirrors 112) coupled to a propulsion portion of a vehicle. The light may be a beam of light (e.g., a laser). The light may be emitted by a light transmitter (e.g., the light transmitter 102) coupled to a fixed portion of the vehicle. The light emitted at the mirrors may be reflected by the mirrors towards a measuring area.

At block 1204, portions of light reflected from the measuring area are received at a light receiver (e.g., the light receiver 104) coupled to a fixed portion of the vehicle.

FIG. 13 is a flow diagram of a process 1300 for remote sensing according to some embodiments. The process 1300 is described with reference to FIGS. 1-13. The process 1300 may be performed by a remote sensing system (e.g., the remote sensing system 100) as described.

At block 1302, light is emitted at mirrors (e.g., the mirrors 112) coupled to a propulsion portion of a vehicle. The light may be a beam of light (e.g., a laser). The light may be emitted by a light transmitter (e.g., the light transmitter 102) coupled to a fixed portion of the vehicle. The light emitted at the mirrors may be reflected by the mirrors towards a measuring area.

At block 1304, portions of light reflected from the measuring area are received at a light receiver (e.g., the light receiver 104) coupled to a fixed portion of the vehicle.

At block 1306, light received at the light receiver is detected. The light may be detected by a light detector (e.g., the light detector 106).

At block 1308, a remote sensing data signal is generated. The remote sensing data signal may include information about a time delay between the emission of the light in the block 1302 and the receipt of the light in the block 1304. The remote sensing data signal may be generated by the light detector (e.g., the light detector 106).

At block 1310, the remote sensing data signal is processed. The remote sensing data signal may be processed by a processor (e.g., the processor 110). Processing the remote sensing data signal may include determining a direction associated with the remote sensing data signal and a distance to the measuring area in the direction associated with the remote sensing data signal.

Figure 14:
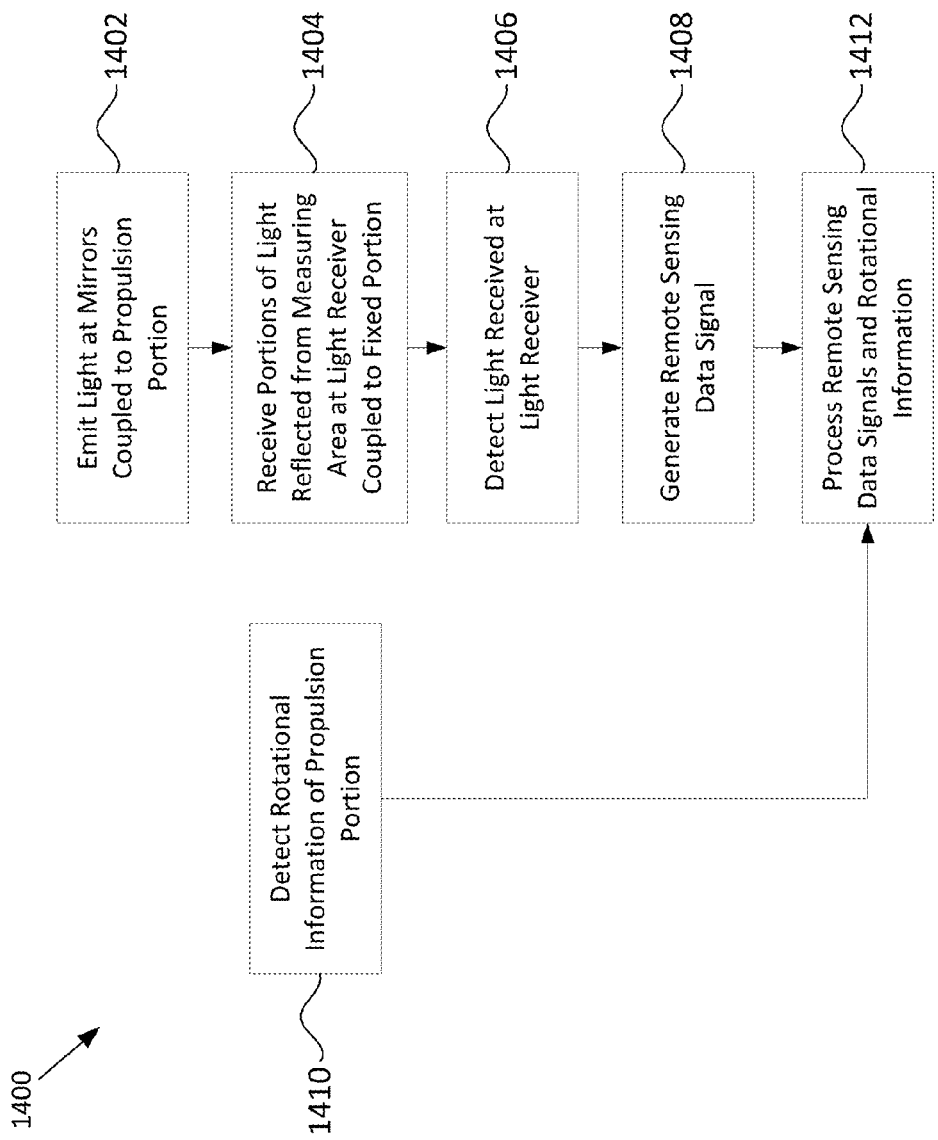
FIG. 14 is a flow diagram of a process for remote sensing according to some embodiments.

FIG. 14 is a flow diagram of a process 1400 for remote sensing according to some embodiments. The process 1400 is described with reference to FIGS. 1-14. The process 1400 may be performed by a remote sensing system (e.g., remote sensing system 100) as described.

At block 1402, light is emitted at mirrors (e.g., the mirrors 112) coupled to a propulsion portion of a vehicle. The light may be a beam of light (e.g., a laser). The light may be emitted by a light transmitter (e.g., the light transmitter 102) coupled to a fixed portion of the vehicle. The light emitted at the mirrors may be reflected by the mirrors towards a measuring area.

At block 1404, portions of light reflected from the measuring area are received at a light receiver (e.g., the light receiver 104) coupled to a fixed portion of the vehicle.

At block 1406, light received at the light receiver is detected. The light may be detected by a light detector (e.g., the light detector 106).

At block 1408, a remote sensing data signal is generated. The remote sensing data signal may include information about a time delay between the emission of the light in the block 1402 and the receipt of the light in the block 1404. The remote sensing data signal may be generated by the light detector (e.g., the light detector 106).

At block 1410, rotational information of the propulsion portion is detected. Detection of the rotational information may be performed by a rotational sensor (e.g., the rotational sensor 108). Detection of the rotational information may include determination of an angular position of the propulsion portion.

At block 1412, the remote sensing data signal and the rotational information are processed. The remote sensing data signal and the rotational information may be processed by a processor (e.g., the processor 110). Processing the rotational information may include determining a direction along an axis of rotation (e.g., of the propulsion portion) for a remote sensing data signal. Processing the rotational information may include determining a direction along an axis perpendicular to an axis of rotation (e.g., of the propulsion portion) for a remote sensing data signal. Processing the remote sensing data signal may include determining a direction associated with the remote sensing data signal and a distance to the measuring area in the direction associated with the remote sensing data signal.

Figure 15:
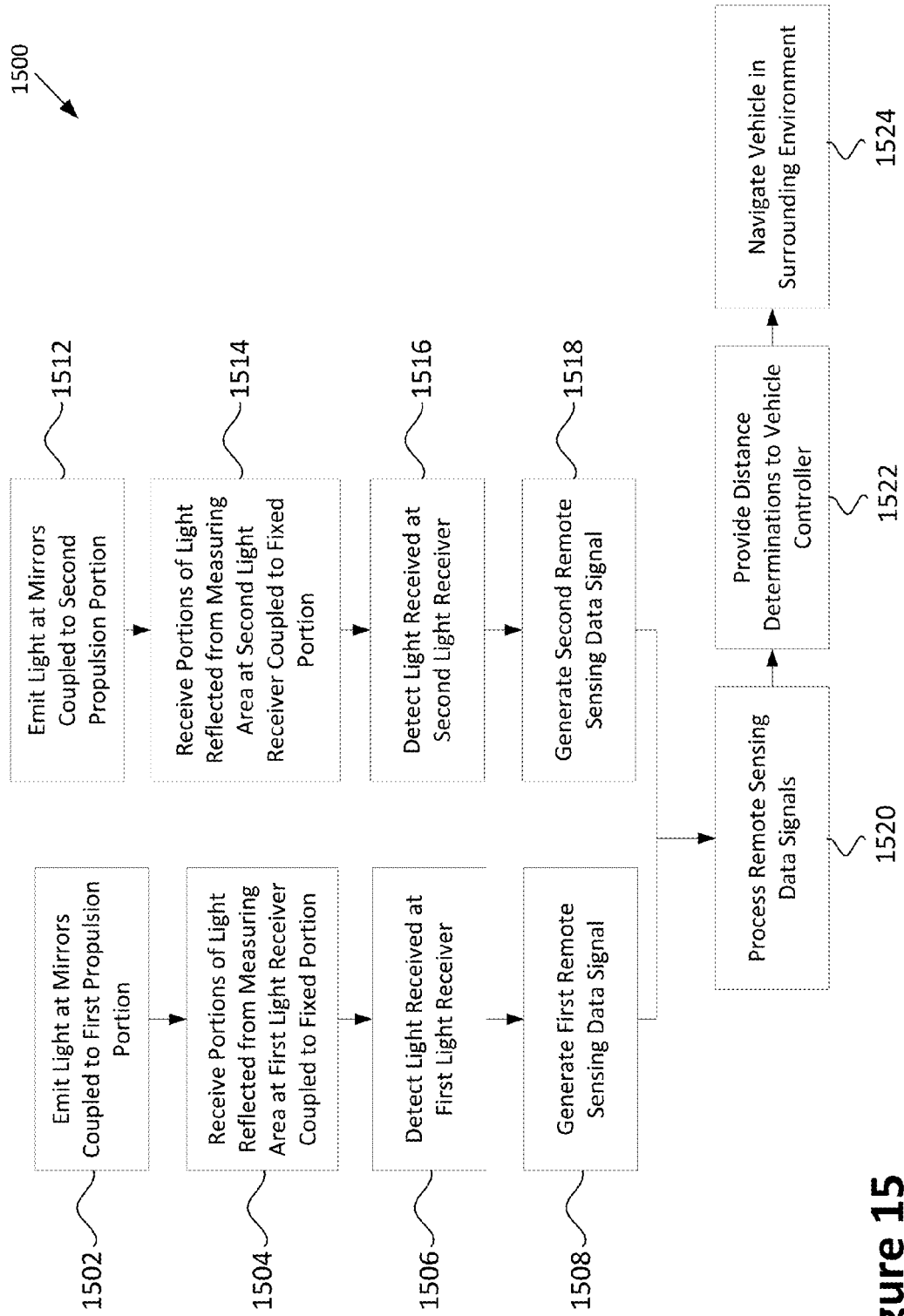
FIG. 15 is a flow diagram of a process for remote sensing according to some embodiments.

FIG. 15 is a flow diagram of a process 1500 for remote sensing according to some embodiments. The process 1500 is described with reference to FIGS. 1-15. The process 1500 may be performed by a remote sensing system (e.g., remote sensing system 100) as described.

At block 1502, light is emitted at mirrors (e.g., the mirrors 112) coupled to a first propulsion portion of a vehicle. The light may be a beam of light (e.g., a laser). The light may be emitted by a first light transmitter (e.g., the light transmitter 102) coupled to a fixed portion of the vehicle. The light emitted at the mirrors may be reflected by the mirrors towards a measuring area.

At block 1504, portions of light reflected from the measuring area are received at a first light receiver (e.g., the light receiver 104) coupled to a fixed portion of the vehicle.

At block 1506, light received at the first light receiver is detected. The light may be detected by a first light detector (e.g., the light detector 106).

At block 1508, a first remote sensing data signal is generated. The first remote sensing data signal may include information about a time delay between the emission of the light in the block 1502 and the receipt of the light in the block 1504. The first remote sensing data signal may be generated by the first light detector (e.g., the light detector 106).

At block 1512, light is emitted at mirrors (e.g., the mirrors 112) coupled to a second propulsion portion of a vehicle. The light may be a beam of light (e.g., a laser). The light may be emitted by a second light transmitter (e.g., the light transmitter 102) coupled to a fixed portion of the vehicle. The light emitted at the mirrors may be reflected by the mirrors towards the measuring area.

At block 1514, portions of light reflected from the measuring area are received at a second light receiver (e.g., the light receiver 104) coupled to a fixed portion of the vehicle.

At block 1516, light received at the second light receiver is detected. The light may be detected by a second light detector (e.g., the light detector 106).

At block 1518, a second remote sensing data signal is generated. The second remote sensing data signal may include information about a time delay between the emission of the light in the block 1512 and the receipt of the light in the block 1514. The second remote sensing data signal may be generated by the second light detector (e.g., the light detector 106).

At block 1520, the first remote sensing data signal and the second remote sensing data signal are processed. The remote sensing data signals may be processed by a processor (e.g., the processor 110). Processing the remote sensing data signals may include determining a direction associated with each of the remote sensing data signals and a distance to the measuring area in the direction associated with each of the remote sensing data signals.

At block 1522, the distance determinations are provided to a vehicle controller (e.g., controller 124). Providing the distance determinations may include transmitting the distance determination and direction determination based on the first remote sensing data signal to the vehicle controller. Providing the distance determinations may additionally include transmitting the distance determination and direction determination based on the second remote sensing data signal to the vehicle controller.

At block 1524, the vehicle is navigated in the surrounding environment. The vehicle controller may navigate the vehicle in the surrounding environment based on the provided distance and direction determinations from the block 1522. Navigating the vehicle in the surrounding environment may include controlling the first propulsion portion and the second propulsion portion so that the vehicle avoids obstacles defined by the distance and direction determinations provided at the block 1522.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The invention claimed is:

1. A remote sensing system coupled to a vehicle, the remote sensing system comprising:
 a first plurality of mirrors coupled to a first propulsion portion of the vehicle;
 a first set of one or more light transmitters, coupled to a first fixed portion of the vehicle, and configured to emit light at the first plurality of mirrors to be reflected to a first measuring area; and
 a first set of one or more light receivers, coupled to the first fixed portion of the vehicle, and configured to receive portions of the emitted light reflected from the first measuring area;
 wherein the first propulsion portion of the vehicle is a portion of the vehicle that rotates about a first axis to cause the vehicle to be propelled in movement;
 wherein a first light transmitter of the first set of one or more light transmitters is arranged relative to a first mirror of the first plurality of mirrors in order to reflect light emissions from the first light transmitter off of the first mirror at a first angle relative to the first axis;
 wherein the first light transmitter is arranged relative to a second mirror of the first plurality of mirrors in order to reflect light emissions from the first light transmitter off of the second mirror at a second angle relative to the first axis, the first angle being different than the second angle.

2. The remote sensing system of claim 1,
 wherein the first propulsion portion of the vehicle comprises a motor configured to propel the vehicle.

3. The remote sensing system of claim 2,
 wherein the motor comprises at least one of an outrunner motor, an inrunner motor, a hollow bore motor, and a gas powered motor.

4. The remote sensing system of claim 1,
 wherein the first propulsion portion of the vehicle comprises at least one of: a rotor, an axle, and a wheel.

5. The remote sensing system of claim 1,
 wherein the first fixed portion of the vehicle is a portion of the vehicle that does not rotate in order to cause the vehicle to be propelled in movement.

6. The remote sensing system of claim 1,
 wherein a first mirror of the first plurality of mirrors is fixed at a first angle relative to the first axis;
 wherein a second mirror of the first plurality of mirrors is fixed at a second angle relative to the first axis, axis; and
 wherein the first angle is different than the second angle.

7. The remote sensing system of claim 6,
 wherein the first mirror of the first plurality of mirrors is fixed at a third angle relative to a second axis,
 wherein the second mirror of the first plurality of mirrors is fixed at a fourth angle relative to the second axis,
 wherein the third angle is different than the fourth angle, and
 wherein the second axis is perpendicular to the first axis.

8. The remote sensing system of claim 1,
 wherein the first plurality of mirrors comprises a band of mirrors around at least a portion of a circumference of the first propulsion portion of the vehicle.

9. The remote sensing system of claim 1,
 wherein a second light transmitter of the first set of one or more light transmitters is arranged relative to the second mirror in order to reflect light emissions from the second light transmitter off of the second mirror at the second angle relative to the first axis; and
 wherein the first light transmitter emits light to be reflected off of the first mirror at the first angle simultaneously in time with the second light transmitter emitting light to be reflected off of the second mirror at the second angle.

10. The remote sensing system of claim 1,
 wherein, at a first time, the first light transmitter emits light to be reflected off of the first mirror at the first angle;
 wherein, at a second time, the first light transmitter emits light to be reflected off of the second mirror at the second angle; and
 wherein the first time is different than the second time.

11. The remote sensing system of claim 10,
 wherein, at the second time, a second light transmitter of the first set of one or more light transmitters emits light to be reflected off of the first mirror at the first angle.

12. The remote sensing system of claim 11,
 wherein, at a third time, the first light transmitter emits light to be reflected off of a third mirror of the first plurality of mirrors at a third angle relative to the first axis, axis; and
 wherein, at the third time, the second light transmitter emits light to be reflected off of the second mirror at the second angle.

13. The remote sensing system of claim 1, further comprising:
 a first set of one or more light detectors, coupled to the first set of one or more light receivers, configured to generate first remote sensing data signals based on the portions of the emitted light reflected from the first measuring area and received by the first set of one or more light receivers; and
 a processor configured to receive the first remote sensing data signals from the first set of one or more light detectors.

14. The remote sensing system of claim 13,
 wherein the processor is configured to process the first remote sensing data signals received from the first set of one or more light detectors in order to determine a distance from the vehicle to the first measuring area.

15. The remote sensing system of claim 14,
 wherein the processor is configured to provide the determined distance to the first measuring area to a controller of the vehicle in order to navigate the vehicle in motion through a surrounding environment including the first measuring area.

16. The remote sensing system of claim 13, further comprising:
 a second plurality of mirrors coupled to a second propulsion portion of the vehicle;
 a second set of one or more light transmitters, coupled to a second fixed portion of the vehicle, configured to emit light at the second plurality of mirrors to be reflected to a second measuring area;
 a second set of one or more light receivers, coupled to the second fixed portion of the vehicle, configured to receive portions of the emitted light reflected from the second measuring area; and
 a second set of one or more light detectors, coupled to the second set of one or more light receivers, configured to generate second remote sensing data signals based on the portions of the emitted light reflected from the second measuring area and received by the second set of one or more light receivers;

wherein the processor is configured to receive the first remote sensing data signals from the first set of one or more light detectors and the second remote sensing data signals from the second set of one or more light detectors; and wherein the first propulsion portion of the vehicle and the second propulsion portion of the vehicle are separate physical structures that each rotate in order to cause the vehicle to be propelled in movement.

17. The remote sensing system of claim 16, wherein the processor is configured to process the first remote sensing data signals received from the first set of one or more light detectors and the second remote sensing data signals from the second set of one or more light detectors in order to determine a distance from the vehicle to the first measuring area and a distance from the vehicle to the second measuring area.

18. The remote sensing system of claim 17, wherein the processor is configured to provide the determined distance to the first measuring area and the determined distance to the second measuring area to a controller of the vehicle in order to navigate the vehicle in motion through a surrounding environment including the first measuring area and the second measuring area.

19. The remote sensing system of claim 16, wherein the processor is configured to process remote sensing data signals in order to determine distances from the vehicle to measuring areas in substantially all directions around the vehicle.

20. The remote sensing system of claim 1, further comprising:

one or more sensors, coupled to the first fixed portion of the vehicle, configured to detect a rotational speed of the first propulsion portion.

21. The remote sensing system of claim 20, further comprising:

a first set of one or more light detectors, coupled to the first set of one or more light receivers, configured to generate first remote sensing data signals based on the portions of the emitted light reflected from the first measuring area and received by the first set of one or more light receivers; and a processor configured to receive the first remote sensing data signals from the first set of one or more light detectors and configured to receive information based on the detected rotational speed of the first propulsion portion.

22. The remote sensing system of claim 21, wherein the processor is configured to process the first remote sensing data signals received from the first set of one or more light detectors and the information based on the detected rotational speed of the first propulsion portion in order to determine a distance from the vehicle to the first measuring area.

23. The remote sensing system of claim 1, wherein the first plurality of mirrors comprises a ring-shaped sequence of individual mirrors located around a circumference of the first propulsion portion of the vehicle.

24. A method of remote sensing in a space around a vehicle, the method comprising:

emitting light from a first set of one or more light transmitters at a first plurality of mirrors to be reflected to a first measuring area, the first plurality of mirrors coupled to a first propulsion portion of the vehicle and the first set of one or more light transmitters coupled to a first fixed portion of the vehicle; and receiving portions of the emitted light reflected from the first set of first measuring area at a first set of one or more light receivers, the first set of one or more light receivers coupled to the first fixed portion of the vehicle;

wherein the first propulsion portion of the vehicle is a portion of the vehicle that rotates about a first axis to cause the vehicle to be propelled in movement;

wherein light emissions of a first light transmitter of the first set of one or more light transmitters reflect off of a first mirror of the first plurality of mirrors at a first angle relative to the first axis;

wherein light emissions of the first light transmitter of the first set of one or more light transmitters reflect off of a second mirror of the first plurality of mirrors at a second angle relative to the first axis, the first angle being different than the second angle.

25. The method of claim 24, wherein the first propulsion portion of the vehicle comprises a motor configured to propel the vehicle.

26. The method of claim 24, wherein the first fixed portion of the vehicle is a portion of the vehicle that does not rotate in order to cause the vehicle to be propelled in movement.

27. The method of claim 24, wherein a first mirror of the first plurality of mirrors is fixed at a first angle relative to the first axis;

wherein a second mirror of the first plurality of mirrors is fixed at a second angle relative to the first axis; and wherein the first angle is different than the second angle.

28. The method of claim 27, wherein the first mirror of the first plurality of mirrors is fixed at a third angle relative to a second axis, wherein the second mirror of the first plurality of mirrors is fixed at a fourth angle relative to the second axis, wherein the third angle is different than the fourth angle, and wherein the second axis is perpendicular to the first axis.

* * * * *